US012700999B2

(12) United States Patent
Bakshi et al.

(10) Patent No.: US 12,700,999 B2
(45) Date of Patent: Aug. 4, 2026

(54) LAPLACE NOISE ENABLED ENCAPSULATION FOR SMART BI-DIRECTIONAL DUAL NODE HASHCHAIN BASED REMODELED DATA CLEAN ROOM BUNDLES

(71) Applicant: Bank of America Corporation, Charlotte, NC (US)

(72) Inventors: Sakshi Bakshi, New Delhi (IN); Sneha Padiyar, East Mumbai (IN); Hariharan Balakrishnan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 176 days.

(21) Appl. No.: 18/795,636

(22) Filed: Aug. 6, 2024

(65) Prior Publication Data

US 2026/0046123 A1     Feb. 12, 2026

(51) Int. Cl.
*H04L 9/08*          (2006.01)

(52) U.S. Cl.
CPC .................................... *H04L 9/088* (2013.01)

(58) Field of Classification Search
CPC . H04L 9/50; H04L 9/088; G06F 21/64; G06F 21/6218; G06F 21/602
See application file for complete search history.

(56) References Cited

U.S. PATENT DOCUMENTS

| | | | | |
|---|---|---|---|---|
| 10,153,978 B1 * | 12/2018 | di Proietto | ............ | H04L 45/306 |
| 10,979,230 B1 * | 4/2021 | Tang | ..................... | H04L 9/3239 |
| 11,329,806 B1 * | 5/2022 | Akkaya | ................. | H04L 9/0844 |
| 11,720,530 B1 * | 8/2023 | Cascioli | ............ | G06F 16/24532 |
| | | | | 709/217 |

(Continued)

OTHER PUBLICATIONS

Yang et al., "Bidirectional Hash Chain Based Key Pre-distribution for Wireless Sensor Networks," 2023 8th International Conference on Automation, Control and Robotics Engineering (CACRE) Year: 2023 | Conference Paper | Publisher: IEEE.*

(Continued)

*Primary Examiner* — Roderick Tolentino
(74) *Attorney, Agent, or Firm* — Banner & Witcoff, Ltd.

(57)          ABSTRACT
Systems and methods enhance data privacy and generate hash keys at identity nodes by processing partial metadata and linking these keys through identity graphs, ensuring no single node has the complete dataset. The method includes performing identity resolution, data anonymization, and re-keying at translation nodes, transforming identifiers into anonymous and re-key IDs. Laplace noise is introduced into translation layer logs using Laplace noise enabler capsules to ensure differential privacy. Metadata is shared between adjacent bundles using bidirectional dual node hashchains, establishing cryptographic links for secure data transmission. Hashed encrypted data packets are verified at a cognitive analytics layer using a gossip protocol for real-time data integrity validation. BERT transformers in an analytics workspace layer create digital tags for secure data sharing linked through knowledge graphs. Parallel data processing is managed using dual node hashchains and the gossip protocol, enhancing performance and resilience against cyberattacks.

20 Claims, 8 Drawing Sheets

Sample Architecture Flow Diagram

(56) References Cited

U.S. PATENT DOCUMENTS

| | | | |
|---|---|---|---|
| 12,437,113 B1 | 10/2025 | Dahme et al. | |
| 2012/0300781 A1* | 11/2012 | Sarela | H04L 45/10 |
| | | | 370/392 |
| 2013/0024701 A1* | 1/2013 | Hwang | H04N 21/4627 |
| | | | 713/189 |
| 2020/0341951 A1* | 10/2020 | Oberhofer | H04L 9/50 |
| 2021/0328770 A1* | 10/2021 | Gaur | H04L 9/0637 |
| 2021/0399959 A1* | 12/2021 | Barry | H04L 41/14 |
| 2022/0141025 A1* | 5/2022 | Bogineni | H04L 9/3236 |
| | | | 713/156 |
| 2022/0197306 A1 | 6/2022 | Cella et al. | |
| 2022/0270725 A1 | 8/2022 | DeRosa-Grund | |
| 2023/0006846 A1* | 1/2023 | Zhu | H04L 63/123 |
| 2023/0206261 A1 | 6/2023 | Cella et al. | |
| 2023/0206329 A1 | 6/2023 | Cella et al. | |
| 2023/0214925 A1 | 7/2023 | Cella et al. | |
| 2023/0316075 A1 | 10/2023 | Cella et al. | |
| 2023/0316305 A1 | 10/2023 | Cella et al. | |
| 2023/0316357 A1 | 10/2023 | Cella et al. | |
| 2023/0325720 A1 | 10/2023 | Cella et al. | |
| 2023/0325811 A1 | 10/2023 | Cella et al. | |
| 2023/0325816 A1 | 10/2023 | Cella et al. | |
| 2023/0325829 A1 | 10/2023 | Cella et al. | |
| 2023/0327850 A1 | 10/2023 | Ghazi et al. | |
| 2023/0342346 A1 | 10/2023 | Cella et al. | |
| 2023/0351292 A1 | 11/2023 | Cella et al. | |
| 2023/0351371 A1 | 11/2023 | Cella et al. | |
| 2023/0351393 A1 | 11/2023 | Cella et al. | |
| 2023/0410090 A1 | 12/2023 | Cella et al. | |
| 2023/0410093 A1 | 12/2023 | Cella et al. | |
| 2023/0410095 A1 | 12/2023 | Cella et al. | |
| 2023/0419277 A1 | 12/2023 | Cella et al. | |
| 2024/0144011 A1 | 5/2024 | Cella et al. | |
| 2024/0144140 A1 | 5/2024 | Cella et al. | |
| 2024/0211847 A1* | 6/2024 | Nagao | G06Q 10/083 |

OTHER PUBLICATIONS

Yang et al., "Trade-off between Resiliency and Connectivity for WSN by Unbalanced Key Predistribution," 2024 16th International Conference on Communication Software and Networks (ICCSN) Year: 2024 | Conference Paper | Publisher: IEEE.*

* cited by examiner

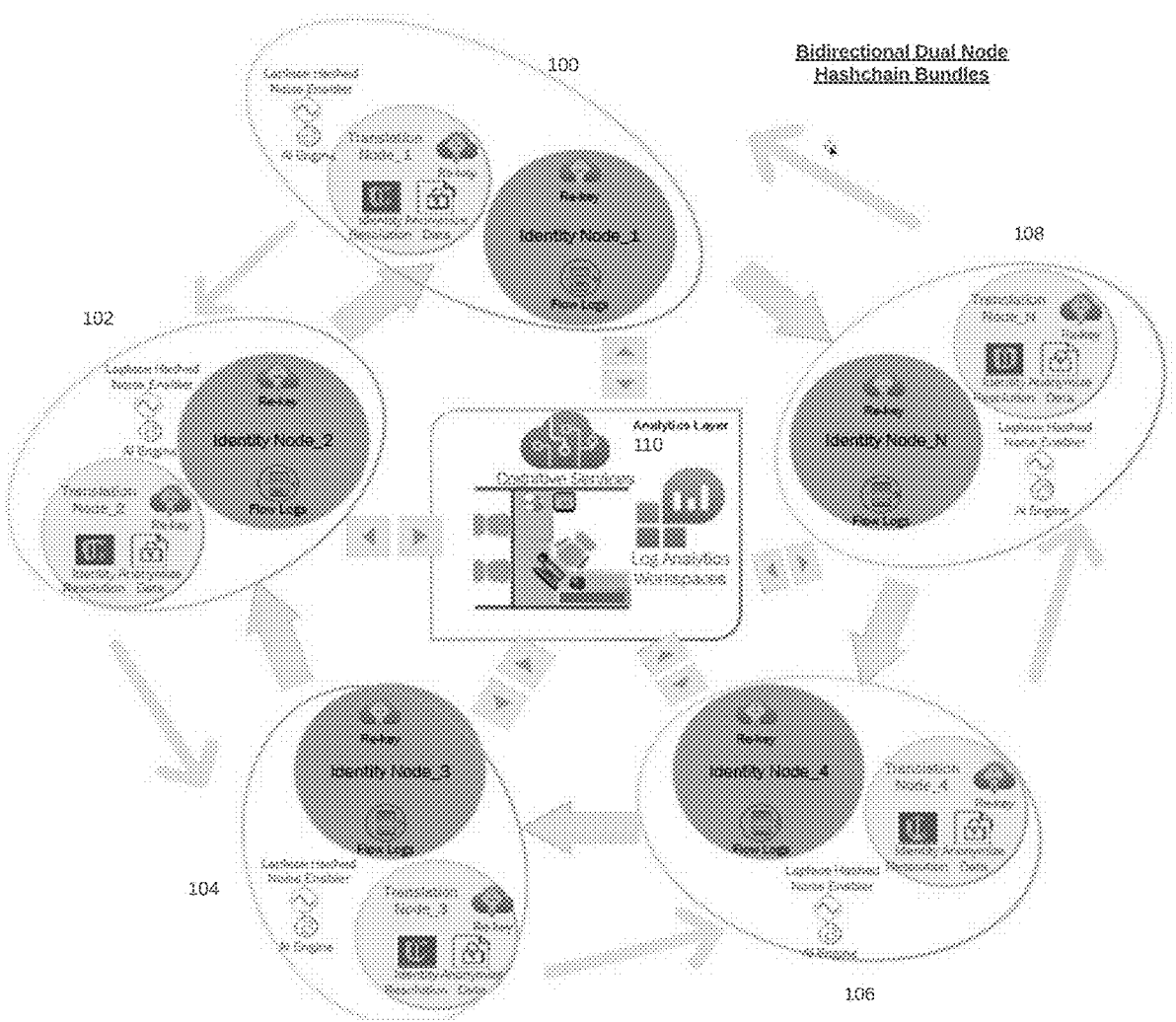
FIG. 1: Sample Architecture Flow Diagram

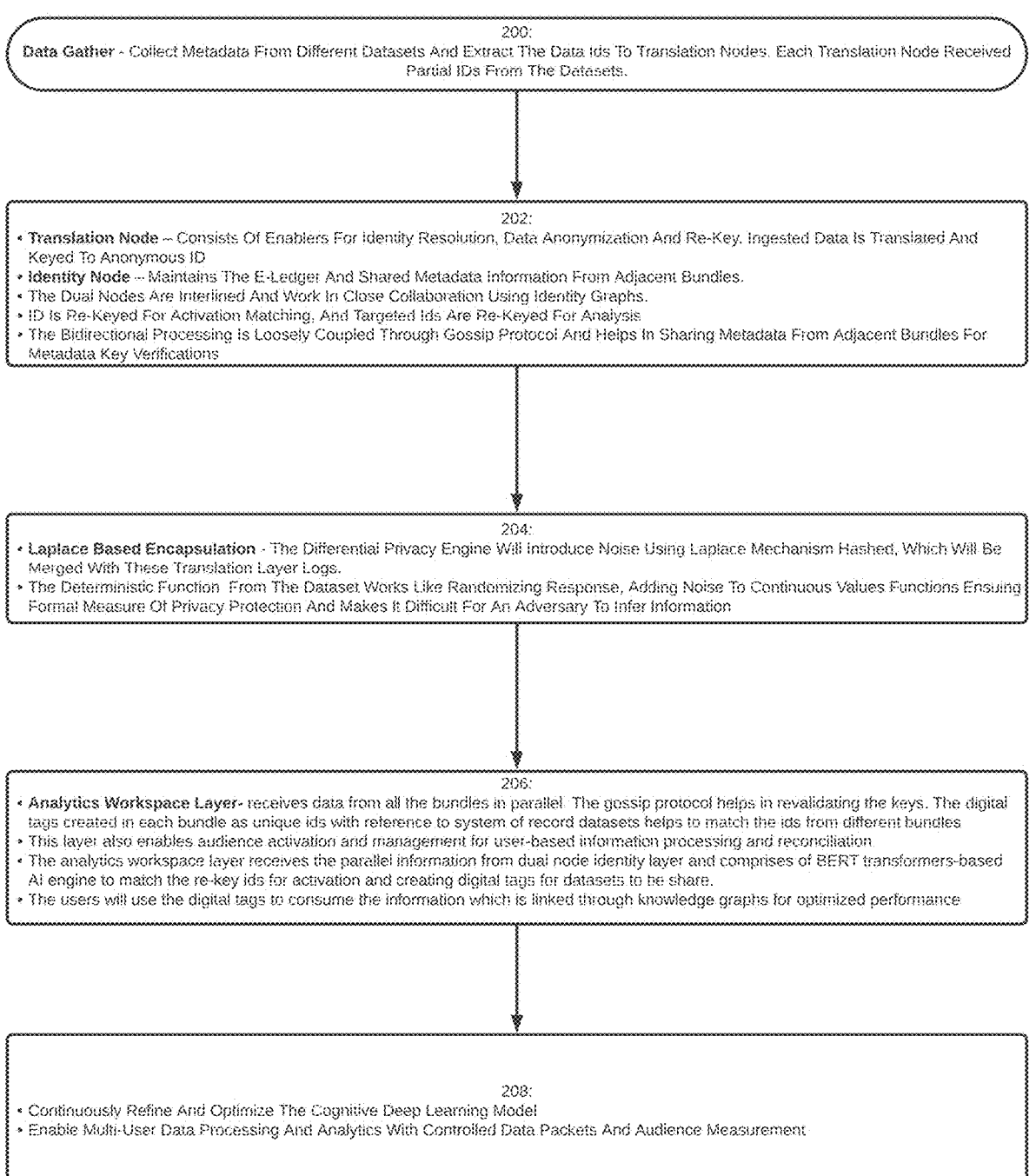

200:
Data Gather - Collect Metadata From Different Datasets And Extract The Data Ids To Translation Nodes. Each Translation Node Received Partial IDs From The Datasets.

202:
• Translation Node – Consists Of Enablers For Identity Resolution, Data Anonymization And Re-Key. Ingested Data Is Translated And Keyed To Anonymous ID
• Identity Node – Maintains The E-Ledger And Shared Metadata Information From Adjacent Bundles.
• The Dual Nodes Are Interlined And Work In Close Collaboration Using Identity Graphs.
• ID Is Re-Keyed For Activation Matching, And Targeted Ids Are Re-Keyed For Analysis
• The Bidirectional Processing Is Loosely Coupled Through Gossip Protocol And Helps In Sharing Metadata From Adjacent Bundles For Metadata Key Verifications 204:
• Laplace Based Encapsulation - The Differential Privacy Engine Will Introduce Noise Using Laplace Mechanism Hashed, Which Will Be Merged With These Translation Layer Logs.
• The Deterministic Function From The Dataset Works Like Randomizing Response, Adding Noise To Continuous Values Functions Ensuring Formal Measure Of Privacy Protection And Makes It Difficult For An Adversary To Infer Information 206:
• Analytics Workspace Layer- receives data from all the bundles in parallel. The gossip protocol helps in revalidating the keys. The digital tags created in each bundle as unique ids with reference to system of record datasets helps to match the ids from different bundles
• This layer also enables audience activation and management for user-based information processing and reconciliation
• The analytics workspace layer receives the parallel information from dual node identity layer and comprises of BERT transformers-based AI engine to match the re-key ids for activation and creating digital tags for datasets to be share.
• The users will use the digital tags to consume the information which is linked through knowledge graphs for optimized performance 208:
• Continuously Refine And Optimize The Cognitive Deep Learning Model
• Enable Multi-User Data Processing And Analytics With Controlled Data Packets And Audience Measurement

FIG. 2: Sample Process Flow Illustration

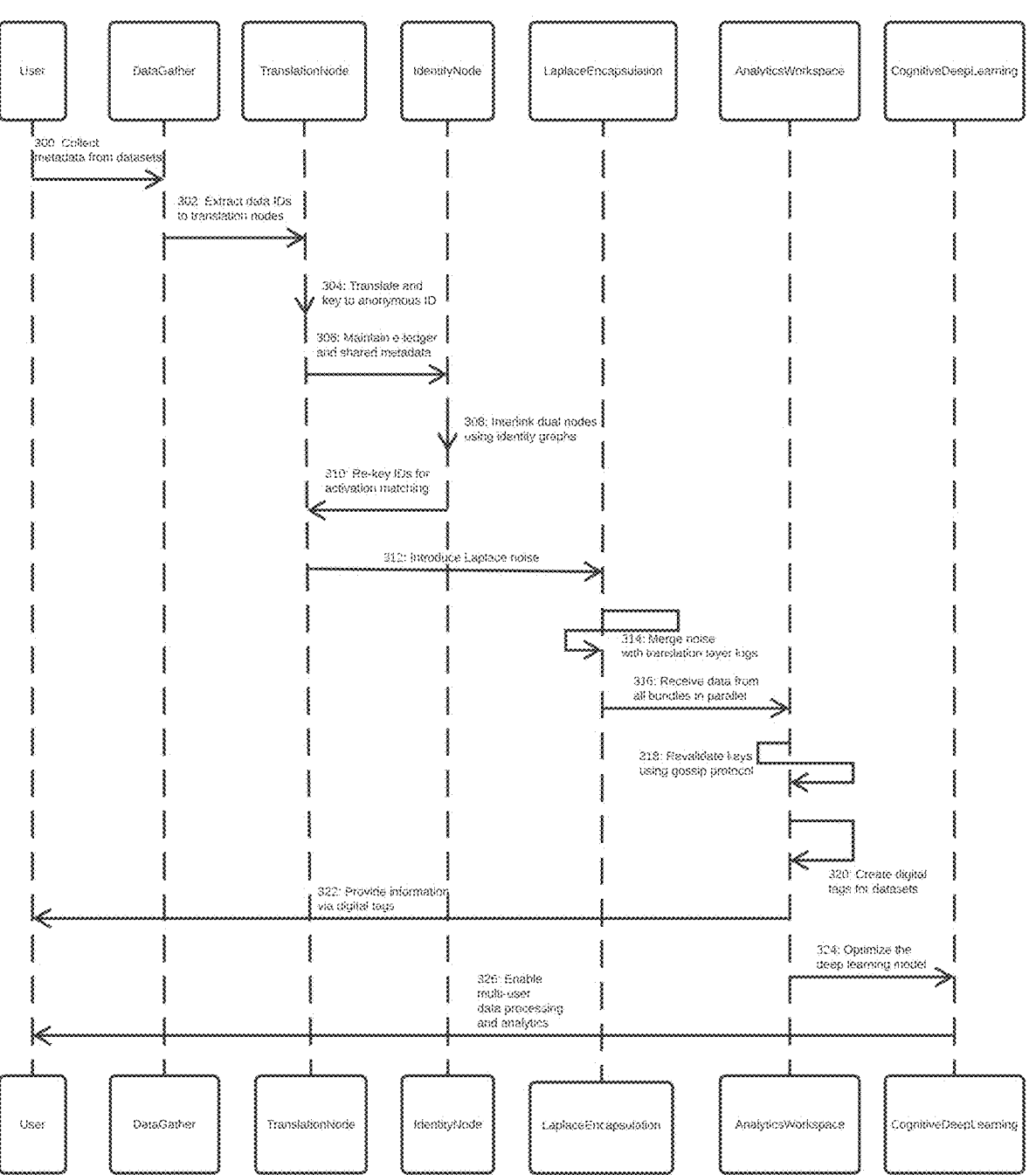
FIG. 3: Sample Sequence Diagram

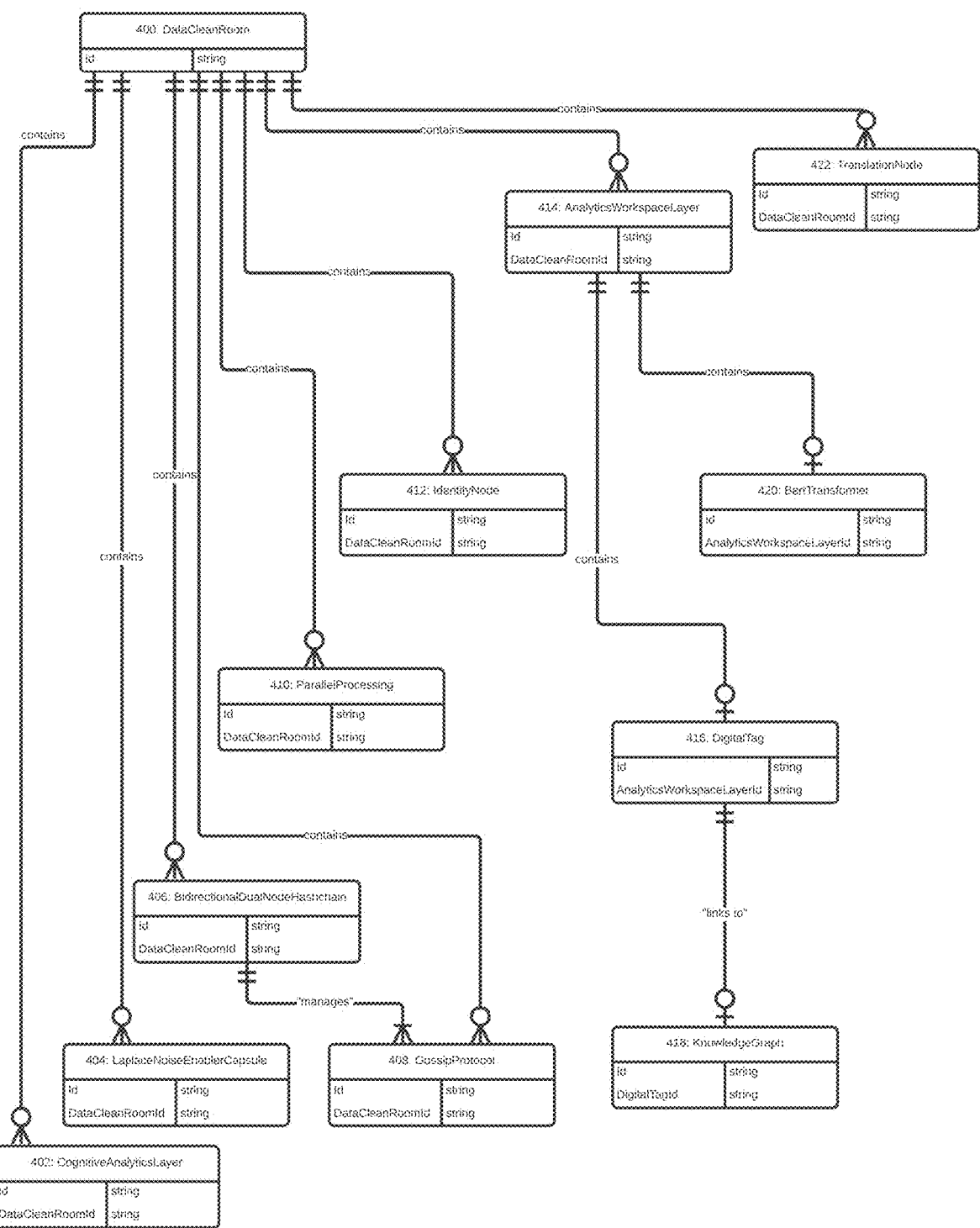
FIG. 4: Sample Entity Relationship Diagram

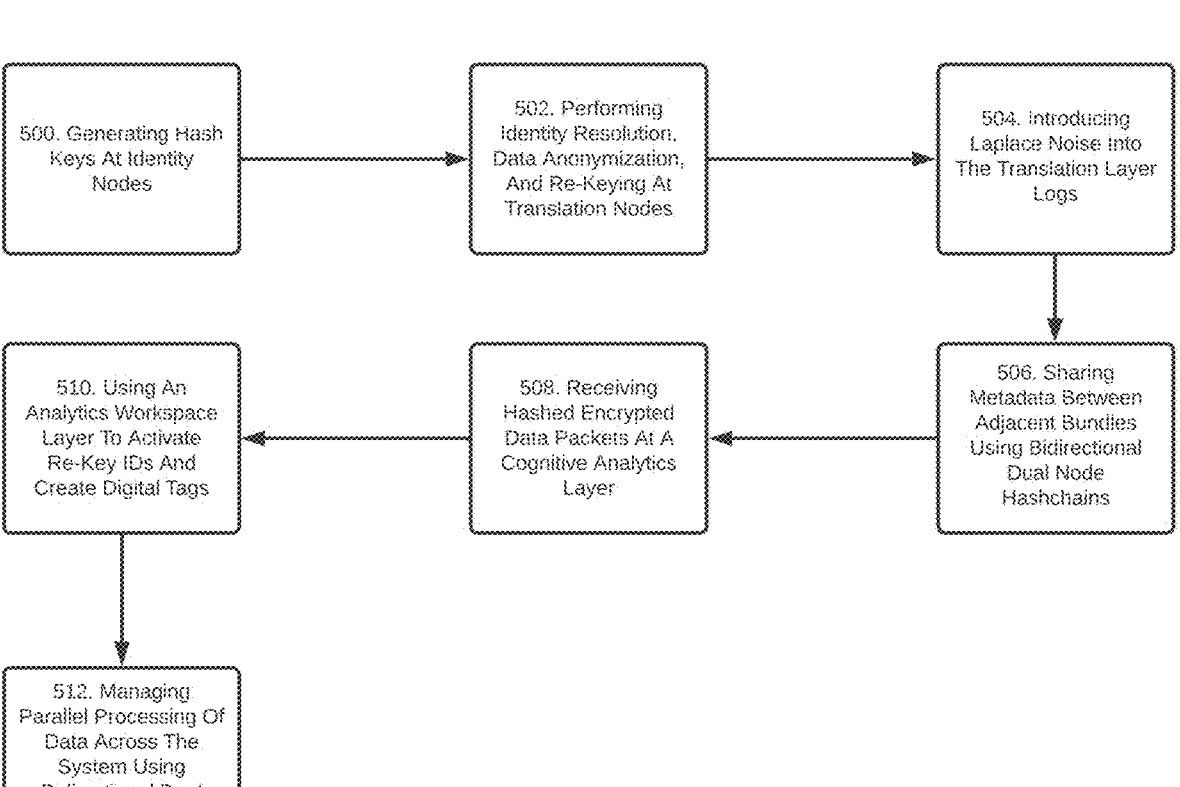
FIG. 5: Flow Diagram

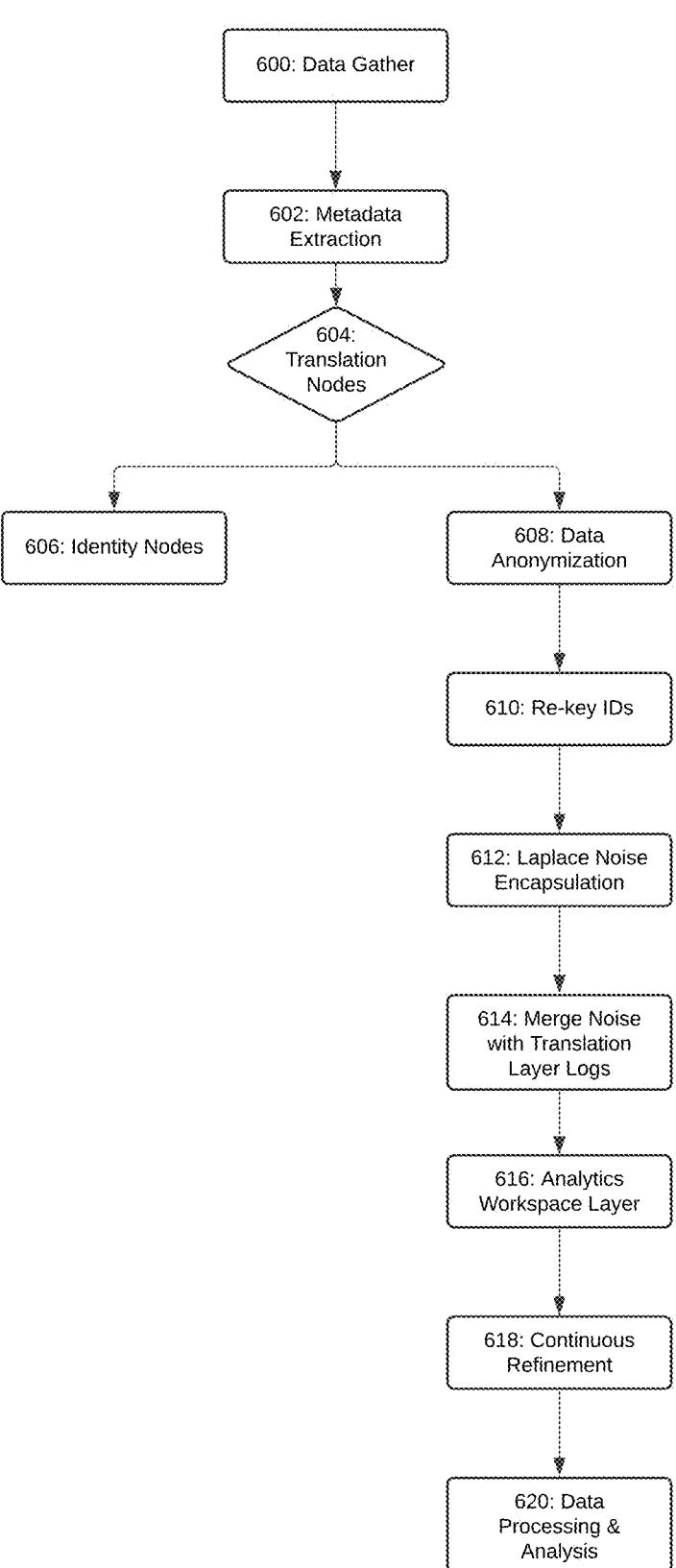
FIG. 6: Laplace Noise Illustration

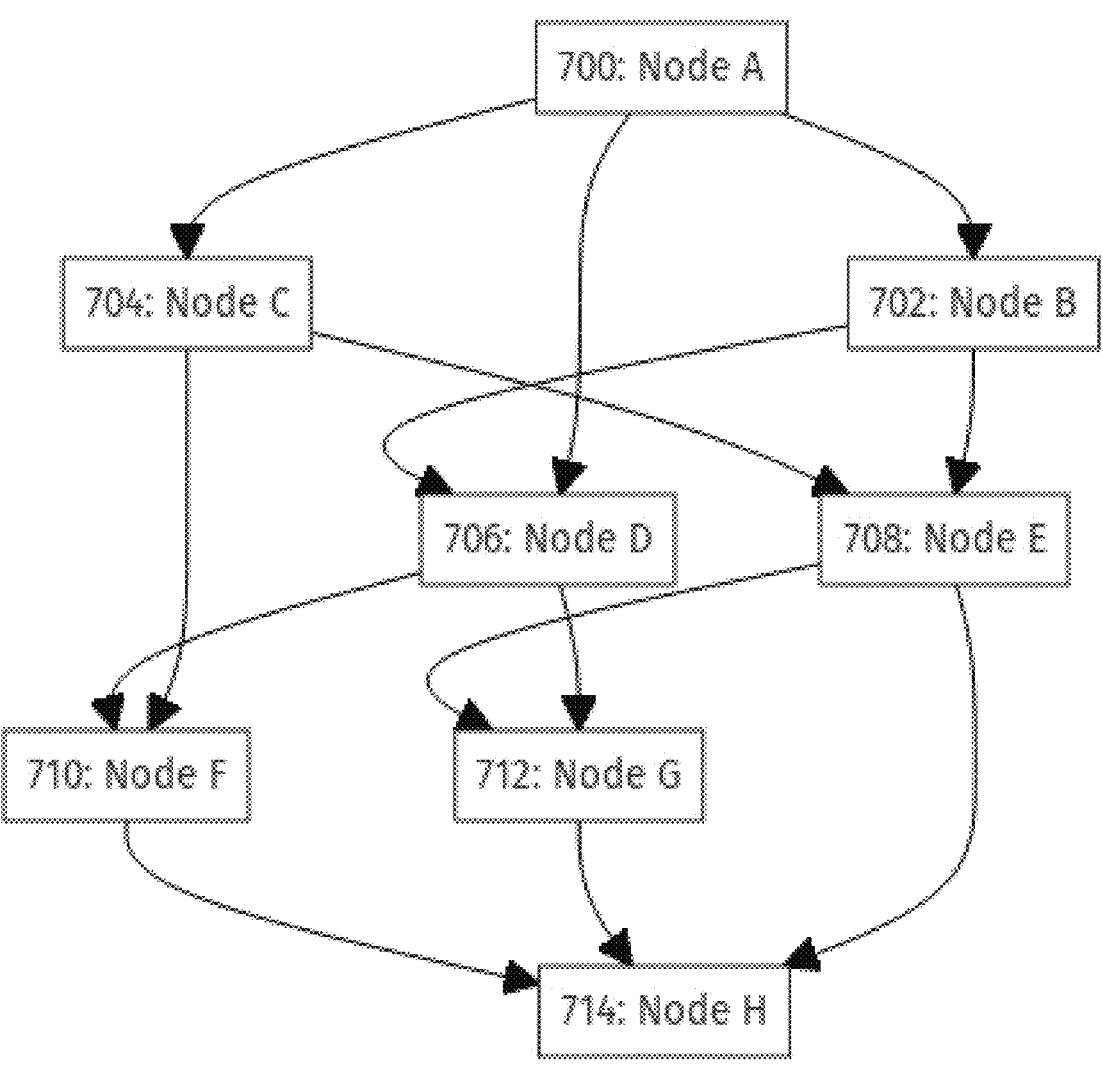
FIG. 7: Gossip Protocol Illustration

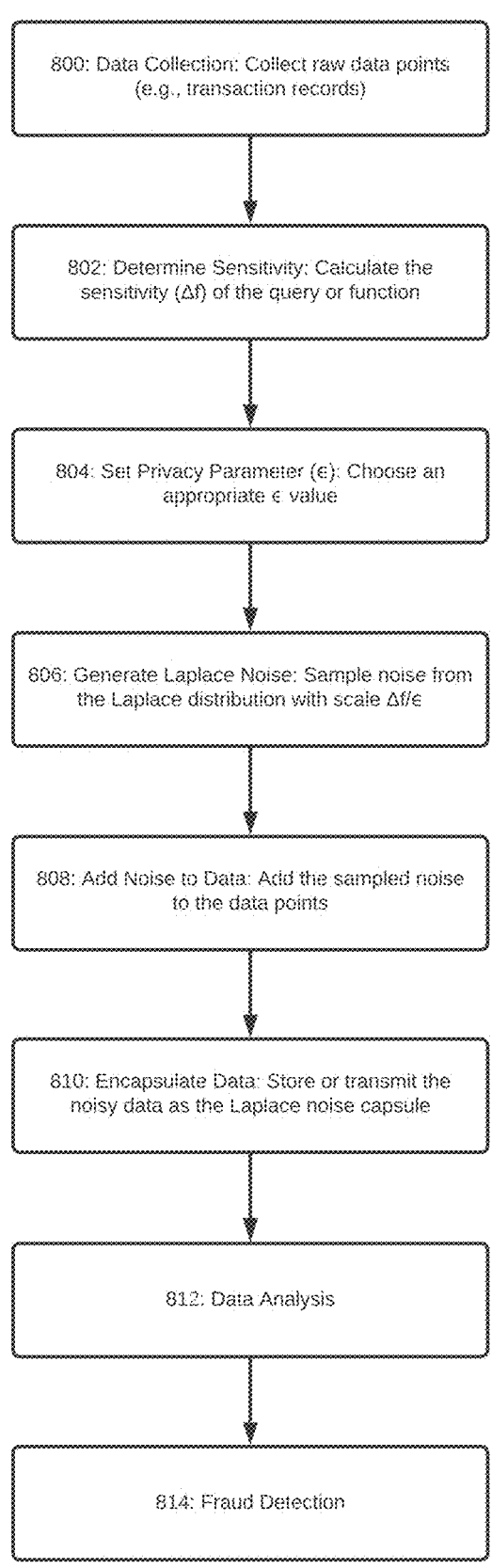
FIG. 8: Laplace Noise Capsulation Sample

LAPLACE NOISE ENABLED ENCAPSULATION FOR SMART BI-DIRECTIONAL DUAL NODE HASHCHAIN BASED REMODELED DATA CLEAN ROOM BUNDLES

TECHNICAL FIELD

The inventions disclosed herein pertain to the field of cryptography and security systems, particularly to systems and methods for ensuring data privacy and security in digital communications. This field involves the use of cryptographic techniques to protect data integrity, confidentiality, and authenticity. The disclosed inventions address issues related to data leakage and cyber-attacks by employing bidirectional dual node hashchains and Laplace noise enabler capsules to enhance the security of data clean rooms. This includes cryptographic protocols for secure metadata sharing and data anonymization to prevent unauthorized access and data breaches.

DESCRIPTION OF THE RELATED ART

Data privacy and security have become paramount concerns in today's digital technology, where vast amounts of sensitive information are exchanged across various platforms. The proliferation of digital communication and storage systems has led to an increase in the risk of data breaches and unauthorized access. Traditional security measures, although advanced, often fail to prevent sophisticated cyber-attacks, leading to significant data leakage. These breaches can occur through vulnerabilities in applications, insecure communication channels, and inadequate data protection protocols, causing a severe breach of trust and potential harm to individuals and organizations. In particular, the compromise of personal data can result in identity theft, financial loss, and reputational damage, while organizations may face legal issues, financial consequences, and loss of customer trust.

One of the primary challenges is ensuring that data shared across different platforms and applications remains secure and private. Data clean rooms have emerged as a solution, providing a secure environment for processing and analyzing sensitive data without exposing the actual information. However, current data clean room architectures suffer from performance issues and are not entirely immune to data leakage and cyber-attacks. These rooms must balance the need for high performance with stringent security measures, a task that is increasingly difficult as the volume and complexity of data grow. Furthermore, the latency introduced by additional security layers can hinder the real-time processing capabilities essential for many applications, making the current implementations less effective in dynamic and high-speed environments.

Moreover, existing data security solutions often rely on centralization, making them susceptible to single points of failure. If an attacker compromises the central system, they can potentially gain access to all the data within that system. This centralized approach also poses scalability challenges, as the system needs to manage an ever-increasing amount of data while maintaining high security standards. Decentralized systems, while offering better resilience, still face challenges in ensuring data integrity and security across all nodes. The lack of a robust mechanism to securely manage and distribute data in a decentralized manner leaves systems vulnerable to targeted attacks, data corruption, and unauthorized access.

The risk of reverse engineering data from anonymized datasets is another critical issue. Attackers can use sophisticated techniques to re-identify individuals from anonymized data, leading to privacy breaches. This problem is exacerbated by the fact that many anonymization methods are not foolproof and can be defeated with enough auxiliary information. Consequently, there is a need for more robust privacy-preserving techniques that can withstand such attacks. The growing availability of powerful data analytics tools and the increasing volume of public and private data sources make it easier for adversaries to cross-reference and de-anonymize datasets, thus compromising privacy.

Data leakage through legitimate communication channels is also a significant concern. Even when data is shared intentionally between entities, there is a risk that it can be intercepted or misused. This issue is particularly pertinent in scenarios where sensitive information is exchanged, such as financial transactions, personal records, and personal identification data. Ensuring that such data remains confidential and secure during transmission and storage is a complex challenge. Traditional encryption methods, while effective, may not be sufficient to protect against advanced persistent threats that can attack subtle flaws in implementation or intercept data in transit through sophisticated means.

Additionally, the need for real-time data processing and analysis further complicates data security. Many applications require instantaneous data access and analysis, which can strain security protocols. Balancing the need for speed and efficiency with robust security measures is a critical challenge for modern data systems. The performance overhead introduced by security protocols can significantly impact the usability and effectiveness of data processing systems. In highly competitive and time-sensitive sectors, such as financial trading or emergency response, even minor delays can have substantial consequences, making the integration of security and performance an urgent requirement.

Furthermore, the evolving landscape of data regulations adds another layer of complexity. Governments and regulatory bodies worldwide are implementing stricter data privacy laws, such as the General Data Protection Regulation (GDPR) in Europe. Organizations must navigate these regulations while ensuring that their data handling practices are secure and compliant. Failure to comply with these regulations can result in hefty fines and legal repercussions, making it imperative for organizations to adopt robust data security measures. The challenge is further intensified by the need to stay updated with continually changing regulations across different jurisdictions, each with its specific requirements and enforcement mechanisms.

The lack of a unified approach to data security across different platforms and applications also contributes to the problem. Different systems often have varying security standards and protocols, leading to inconsistencies and potential vulnerabilities. This fragmentation makes it challenging to implement a comprehensive security strategy that can effectively protect data across all touchpoints. Inconsistent security policies and practices across different platforms can create gaps that attackers can target, undermining the overall security posture of an organization.

Moreover, there is a growing concern about the ethical implications of data privacy. Individuals are increasingly aware of how their data is being used and are demanding greater transparency and control. Organizations must not only secure data but also ensure that their practices align with ethical standards and respect user privacy. Addressing these ethical concerns is crucial for maintaining user trust and compliance with evolving privacy standards. The growing consumer awareness and demand for ethical data practices have added pressure on organizations to demonstrate accountability and integrity in their data handling processes.

Despite the availability of various data security technologies, there remains a significant unmet need for a solution that can comprehensively address these challenges. The long felt need for such an invention stems from the persistent vulnerabilities in existing systems and the ever-evolving nature of cyber threats. A solution that can provide robust security without compromising performance, ensure data integrity across decentralized systems, and introduce advanced privacy-preserving techniques is essential. This unmet need highlights the importance of innovation in the field of data privacy and security, driving the demand for new solutions that can effectively safeguard sensitive information in today's digital landscape. Organizations, consumers, and regulatory bodies alike are seeking advanced solutions that can address these multifaceted challenges, ensuring the secure and ethical use of data in an increasingly interconnected world.

SUMMARY OF THE INVENTION

The present invention(s) introduce advanced systems and methods for enhancing data privacy and security in digital communication and storage systems. This innovative system integrates bidirectional dual node hashchains with Laplace noise enabler capsules to form a remodeled data clean room architecture. This architecture significantly improves performance and mitigates risks associated with data leakage and cyber-attacks, thereby providing a robust solution for secure data management. The unique combination of these technologies ensures that sensitive data remains protected throughout its lifecycle, from ingestion to processing and sharing.

The system comprises bundles that include identity nodes and translation nodes, which work in parallel to manage and secure data. Identity nodes generate hash keys and share partial metadata from different datasets through identity graphs. These identity graphs enable secure and efficient metadata linking, ensuring data integrity and confidentiality across the system. The translation nodes add another layer of security by performing critical processes such as identity resolution, data anonymization, and re-keying, which are essential for maintaining data privacy and security. This dual-node approach allows the system to perform complex data operations while maintaining high levels of security and privacy.

One of the core inventive features of this system is the bidirectional property of the dual node hashchains. This unique feature allows for metadata sharing between adjacent bundles, creating a resilient and scalable network. The bidirectional links ensure that data integrity is maintained even if one of the nodes is compromised. This innovative approach provides an additional layer of security by making it difficult for attackers to manipulate or corrupt data without detection, thus enhancing the overall robustness of the system. The bidirectional hashchain also allows for more flexible verification and traversal, which is crucial for maintaining data integrity in a decentralized environment.

Another significant component of the invention is the Laplace noise enabler capsules, which introduce differential privacy into the system. These capsules utilize the Laplace mechanism to add noise to data logs, ensuring that sensitive information remains protected even during data processing and analysis. By merging Laplace noise with the translation layer logs, the system effectively anonymizes data, making it resistant to reverse engineering and other forms of cyber-attacks. This feature is crucial for maintaining privacy in an environment where data must be shared and analyzed without exposing sensitive information. The Laplace noise enabler capsules provide a formal measure of privacy protection, ensuring compliance with stringent data privacy regulations.

The cognitive analytics layer is a critical element of the system, receiving hashed encrypted data packets from various package bundles. This layer verifies the data packets during decryption using a gossip protocol, which facilitates real-time validation and enhances the overall security of the system. The gossip protocol ensures that information is disseminated efficiently and reliably among the nodes, maintaining data integrity and consistency across the network. This decentralized communication method is essential for ensuring the reliability and resilience of the system, as it reduces the risk of single points of failure and ensures continuous operation.

In addition to the cognitive analytics layer, the system features an analytics workspace layer that leverages BERT transformers. These transformers are advanced AI models capable of bidirectional reading and validation of data. They play a vital role in re-key ID activation and the creation of digital tags for datasets. The digital tags are unique identifiers that help in the secure sharing and consumption of information, linking data through knowledge graphs for optimized performance. This ensures that the system can process and analyze data efficiently while maintaining high levels of security and privacy. The use of BERT transformers in the analytics workspace layer enables the system to perform complex data operations and maintain data integrity across multiple nodes.

The system's decentralized approach, using gossip protocol and bidirectional dual node hashchains, ensures robust security and scalability. Each bundle within the system operates as a closely knit package, loosely coupled through the gossip protocol. This architecture allows for parallel processing, which optimizes performance and enhances the system's resilience to cyber-attacks. The decentralized nature also reduces the risk of single points of failure, making the system more reliable and secure. This approach ensures that the system can handle large volumes of data without compromising its security, providing a scalable solution for various applications.

Identity nodes within the system generate partial metadata from different datasets and create hash keys that link through identity graphs. This process ensures that data is securely shared and managed across the network. The translation nodes handle anonymization and re-keying, converting ingested data into anonymous IDs and re-key IDs. This transformation ensures that sensitive information remains protected throughout its lifecycle. The combination of identity and translation nodes creates a robust framework for secure data management, enabling the system to perform complex data operations while maintaining high levels of security and privacy.

The Laplace noise enabler capsules are integral to the system's privacy-preserving capabilities. By introducing noise into the data, these capsules make it difficult for adversaries to infer sensitive information, even when they have access to anonymized data. This approach provides a formal measure of privacy protection, ensuring that the system complies with stringent data privacy regulations and standards. The integration of Laplace noise enabler capsules is a key aspect of the system's innovative approach to data privacy, providing an additional layer of security for sensitive information.

The cognitive analytics layer serves as the center of the system, managing the verification and decryption of encrypted data packets. By using the gossip protocol, this layer ensures that data integrity is maintained and that any discrepancies are quickly identified and addressed. This real-time validation process enhances the security and reliability of the system, providing robust protection against cyber-attacks. The cognitive analytics layer's ability to process data in real-time is essential for maintaining the system's overall performance and security, ensuring that sensitive information remains protected throughout its life-cycle.

The analytics workspace layer, equipped with BERT transformers, performs crucial functions such as re-key ID activation and digital tag creation. These AI-driven processes enable the system to efficiently manage and analyze large volumes of data while maintaining high levels of security and privacy. The digital tags created in this layer are used for secure data sharing and consumption, linking information through knowledge graphs to enhance performance and usability. This ensures that users can access and utilize data securely and efficiently, providing a seamless user experience.

The system's design ensures that even in the event of a cyber-attack, the impact is minimized. The bidirectional dual node hashchains and gossip protocol provide multiple layers of security and redundancy, making it difficult for attackers to compromise the system. If a node is attacked, the other nodes can quickly identify and isolate the issue, ensuring that the system continues to function effectively. This resilience is a crucial aspect of the system's design, ensuring continuous operation even under adverse conditions and providing a robust solution for secure data management.

Furthermore, the system is designed to be scalable, allowing it to handle increasing volumes of data without compromising performance or security. The parallel processing capabilities of the bundles ensure that the system can manage large datasets efficiently, providing real-time data processing and analysis. This scalability is crucial for modern applications that require high-speed data access and processing. The system's ability to scale effectively ensures that it can meet the demands of various applications and industries, providing a versatile solution for secure data management.

In summary, the invention offers a comprehensive solution for enhancing data privacy and security in digital communication and storage systems. By integrating bidirectional dual node hashchains with Laplace noise enabler capsules, the system provides robust protection against data leakage and cyber-attacks. The innovative architecture ensures secure metadata sharing, real-time validation, and optimized performance, addressing the long felt need for advanced, scalable, and privacy-preserving data management solutions. The invention's unique combination of advanced cryptographic techniques, differential privacy, and AI-driven analytics sets a new standard for data security and privacy, providing a robust and scalable solution for modern data management challenges.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, the method for enhancing data privacy in digital communication and storage systems comprises generating hash keys at identity nodes within data clean rooms by processing partial metadata from different datasets and linking the hash keys through identity graphs. The method further includes performing identity resolution, data anonymization, and re-keying at translation nodes within the data clean rooms, wherein the translation nodes transform original identifiers into anonymous IDs and re-key IDs. Additionally, Laplace noise is introduced into the translation layer logs using Laplace noise enabler capsules to add statistical noise to the data, ensuring differential privacy. Metadata is shared between adjacent bundles using bidirectional dual node hashchains to establish cryptographic links for secure and efficient data transmission. The method also involves receiving hashed encrypted data packets at a cognitive analytics layer from various package bundles and verifying the data packets during decryption using a gossip protocol for real-time validation of data integrity. Finally, an analytics workspace layer is used to activate re-key IDs and create digital tags for datasets, facilitating secure data sharing and consumption linked through knowledge graphs.

In some arrangements, the method for enhancing data privacy in digital communication and storage systems includes generating hash keys at identity nodes within data clean rooms by processing partial metadata from different datasets, wherein the hash keys are linked through identity graphs to ensure no single node contains the complete dataset information. The method also involves performing identity resolution, data anonymization, and re-keying at translation nodes within the data clean rooms, wherein the translation nodes receive ingested data and transform original identifiers into anonymous IDs and re-key IDs. Laplace noise is introduced into the translation layer logs using Laplace noise enabler capsules, wherein the Laplace noise is generated by sampling from a Laplace distribution with a scale parameter determined by the sensitivity of the query and the chosen privacy parameter. Metadata is shared between adjacent bundles within the data clean rooms using bidirectional dual node hashchains, wherein the hashchains establish cryptographic links between adjacent nodes to ensure secure and efficient data transmission. The method further includes receiving hashed encrypted data packets at a cognitive analytics layer from various package bundles within the data clean rooms, wherein the cognitive analytics layer verifies the data packets during decryption using a gossip protocol to enable real-time validation of data integrity across the system. BERT transformers in an analytics workspace layer within the data clean rooms are used to activate re-key IDs and create digital tags for datasets, wherein the BERT transformers analyze and match re-key IDs for secure data sharing. The method also involves sharing digital tags created in the analytics workspace layer for secure consumption of information linked through knowledge graphs, wherein the digital tags provide a mechanism for users to securely access and utilize the information. Additionally, the method includes managing parallel processing of data across the system using bidirectional dual node hashchains and the gossip protocol, wherein the coordinated operation ensures optimized performance and enhances system resilience against cyber-attacks.

In some arrangements, the identity nodes distribute metadata across multiple nodes to prevent unauthorized access and reconstruction of the original data, further comprising the step of periodically updating the identity graphs to reflect changes in the metadata and ensure continuous integrity and security.

In some arrangements, the translation nodes transform original identifiers into anonymous IDs and re-key IDs to maintain privacy during data processing and analysis, further comprising the step of implementing an additional layer of encryption at the translation nodes to secure the anonymous and re-key IDs before they are stored or transmitted.

In some arrangements, the Laplace noise enabler capsules add statistical noise to the data by sampling from a Laplace distribution with a scale parameter, further comprising the steps of determining the sensitivity of the query based on the maximum change in the output that can result from changing a single input in the dataset, selecting an appropriate privacy parameter to balance privacy and data utility, and generating noise values from the Laplace distribution.

In some arrangements, the Laplace noise introduced ensures differential privacy, making it computationally infeasible for adversaries to infer sensitive information from the anonymized data, further comprising the step of verifying the effectiveness of the noise addition by performing privacy risk assessments on the encapsulated data.

In some arrangements, the bidirectional dual node hashchains facilitate secure and efficient metadata sharing by establishing cryptographic links between adjacent nodes, further comprising the step of periodically auditing the hashchain links to ensure their integrity and detect any unauthorized modifications.

In some arrangements, the gossip protocol used by the cognitive analytics layer enables real-time validation of data integrity by disseminating metadata efficiently and reliably among the nodes, further comprising the steps of configuring the gossip protocol to operate with randomized peer selection to enhance security and prevent targeted attacks, and implementing error-checking mechanisms to identify and correct inconsistencies in the disseminated metadata.

In some arrangements, the BERT transformers in the analytics workspace layer perform advanced natural language processing to analyze and match re-key IDs for activation and creation of digital tags, further comprising the step of training the BERT transformers on a diverse dataset to improve their accuracy and robustness in identity resolution and tag creation.

In some arrangements, the digital tags created for datasets are unique identifiers that facilitate secure data sharing and consumption by linking data through knowledge graphs, further comprising the steps of generating knowledge graphs that map the relationships between different data points and entities within the system, and continuously updating the knowledge graphs to reflect new data and changes in existing data to ensure accurate and up-to-date tagging.

In some arrangements, the parallel processing capabilities managed by the bidirectional dual node hashchains and gossip protocol ensure scalability and resilience against cyber-attacks, allowing the system to handle large volumes of data efficiently. This further comprises the steps of dynamically allocating computational resources to different nodes based on data processing demands, and implementing load balancing techniques to distribute the data processing workload evenly across the nodes to prevent bottlenecks and ensure high performance.

In some arrangements, the method further comprises utilizing a blockchain framework to enhance the security and immutability of the hash keys and metadata, wherein the blockchain framework ensures that each transaction is securely recorded and cannot be altered without detection.

In some arrangements, the translation nodes further include a machine learning module to improve the accuracy of identity resolution and anonymization processes. The machine learning module is trained continuously on newly ingested data to adapt to evolving patterns and enhance its performance.

In some arrangements, the method further comprises integrating homomorphic encryption techniques at the translation nodes, allowing computations to be performed on encrypted data without decrypting it, thereby maintaining data privacy throughout the processing stages.

In some arrangements, the cognitive analytics layer employs federated learning to enable collaborative model training across multiple nodes without sharing raw data, enhancing data privacy while improving the machine learning model's accuracy and robustness.

In some arrangements, the method further comprises implementing zero-knowledge proofs to verify data integrity and authenticity within the data clean rooms, ensuring that transactions and data manipulations can be validated without revealing the actual data.

In some arrangements, the digital tags created by the BERT transformers are further enhanced with metadata attributes that describe the data's origin, transformation history, and access controls, providing comprehensive traceability and governance.

In some arrangements, the method further comprises utilizing an advanced access control mechanism based on attribute-based encryption (ABE) to manage user permissions and data access within the system, ensuring that only authorized users can access specific data segments.

In some arrangements, the analytics workspace layer includes an anomaly detection module powered by machine learning algorithms to continuously monitor data activities and identify potential security threats or unusual patterns, thereby enhancing the overall security and resilience of the system.

In some arrangements, a method for enhancing data privacy and security in a digital communication and storage system comprises generating hash keys at identity nodes within data clean rooms by processing partial metadata from different datasets, wherein the hash keys are linked through identity graphs to ensure no single node contains the complete dataset information. The method further includes periodically updating the identity graphs to reflect changes in the metadata and ensure continuous integrity and security. It involves performing identity resolution, data anonymization, and re-keying at translation nodes within the data clean rooms, wherein the translation nodes receive ingested data and transform original identifiers into anonymous IDs and re-key IDs. Additionally, the method implements an additional layer of encryption at the translation nodes to secure the anonymous and re-key IDs before they are stored or transmitted.

Laplace noise is introduced into the translation layer logs using Laplace noise enabler capsules, wherein the Laplace noise is generated by sampling from a Laplace distribution with a scale parameter determined by the sensitivity of the query and the chosen privacy parameter. The sensitivity of the query is determined based on the maximum change in the output that can result from changing a single input in the dataset. An appropriate privacy parameter is selected to balance privacy and data utility. Noise values are generated from the Laplace distribution. The effectiveness of the noise addition is verified by performing privacy risk assessments on the encapsulated data.

Metadata is shared between adjacent bundles within the data clean rooms using bidirectional dual node hashchains, wherein the hashchains establish cryptographic links between adjacent nodes to ensure secure and efficient data transmission. The hashchain links are periodically audited to ensure their integrity and detect any unauthorized modifications. Hashed encrypted data packets are received at a cognitive analytics layer from various package bundles within the data clean rooms, wherein the cognitive analytics layer verifies the data packets during decryption using a gossip protocol to enable real-time validation of data integrity across the system. The gossip protocol is configured to operate with randomized peer selection to enhance security and prevent targeted attacks, and error-checking mechanisms are implemented to identify and correct inconsistencies in the disseminated metadata.

BERT transformers are used in an analytics workspace layer within the data clean rooms to activate re-key IDs and create digital tags for datasets, wherein the BERT transformers analyze and match re-key IDs for secure data sharing. The BERT transformers are trained on a diverse dataset to improve their accuracy and robustness in identity resolution and tag creation. Digital tags created in the analytics workspace layer are shared for secure consumption of information linked through knowledge graphs, wherein the digital tags provide a mechanism for users to securely access and utilize the information. Knowledge graphs are generated that map the relationships between different data points and entities within the system, and the knowledge graphs are continuously updated to reflect new data and changes in existing data to ensure accurate and up-to-date tagging.

Parallel processing of data across the system is managed using bidirectional dual node hashchains and the gossip protocol, wherein the coordinated operation ensures optimized performance and enhances system resilience against cyber-attacks. Computational resources are dynamically allocated to different nodes based on data processing demands, and load balancing techniques are implemented to distribute the data processing workload evenly across the nodes to prevent bottlenecks and ensure high performance. A blockchain framework is utilized to enhance the security and immutability of the hash keys and metadata, wherein the blockchain framework ensures that each transaction is securely recorded and cannot be altered without detection.

The method includes a machine learning module at the translation nodes to improve the accuracy of identity resolution and anonymization processes, wherein the machine learning module is trained continuously on newly ingested data to adapt to evolving patterns and enhance its performance. Homomorphic encryption techniques are integrated at the translation nodes, allowing computations to be performed on encrypted data without decrypting it, thereby maintaining data privacy throughout the processing stages. Federated learning is employed at the cognitive analytics layer to enable collaborative model training across multiple nodes without sharing raw data, enhancing data privacy while improving the machine learning model's accuracy and robustness. Zero-knowledge proofs are implemented to verify data integrity and authenticity within the data clean rooms, ensuring that transactions and data manipulations can be validated without revealing the actual data.

Digital tags created by the BERT transformers are further enhanced with metadata attributes that describe the data's origin, transformation history, and access controls, providing comprehensive traceability and governance. An advanced access control mechanism based on attribute-based encryption (ABE) is utilized to manage user permissions and data access within the system, ensuring that only authorized users can access specific data segments. The analytics workspace layer includes an anomaly detection module powered by machine learning algorithms to continuously monitor data activities and identify potential security threats or unusual patterns, thereby enhancing the overall security and resilience of the system.

In some arrangements, a method for enhancing data privacy and security in digital communication and storage systems comprises generating hash keys at identity nodes within data clean rooms by processing partial metadata from different datasets and linking the hash keys through identity graphs. The identity nodes ensure that no single node contains the complete dataset information, thus enhancing security by distributing metadata across multiple nodes to prevent unauthorized access and reconstruction of the original data. This method also includes performing identity resolution, data anonymization, and re-keying at translation nodes within data clean rooms. The translation nodes receive ingested data and transform original identifiers into anonymous IDs and re-key IDs, thereby preventing re-identification of the original data and maintaining privacy during both data processing and analysis stages.

Furthermore, Laplace noise is introduced into the translation layer logs within data clean rooms using Laplace noise enabler capsules. These capsules apply the Laplace mechanism to add statistical noise to the data, enhancing privacy by ensuring differential privacy, which makes it difficult for adversaries to infer sensitive information from the anonymized data even if they possess auxiliary information. The method involves sharing metadata between adjacent bundles within data clean rooms using bidirectional dual node hashchains. These hashchains establish cryptographic links between adjacent nodes to ensure secure and efficient data transmission, thereby maintaining data integrity and consistency across the distributed system and allowing for seamless integration of metadata from different bundles.

Additionally, hashed encrypted data packets are received at a cognitive analytics layer from various package bundles within data clean rooms. The cognitive analytics layer verifies the data packets during decryption using a gossip protocol, enabling real-time validation of data integrity across the system and ensuring that any discrepancies or potential security breaches are quickly identified and addressed. BERT transformers in an analytics workspace layer within data clean rooms are used to activate re-key IDs and create digital tags for datasets. The BERT transformers analyze and match re-key IDs for secure data sharing, facilitating the creation of digital tags that are unique identifiers for datasets, ensuring that information can be securely linked and shared across the system. Digital tags created in the analytics workspace layer within data clean rooms are shared for secure consumption of information linked through knowledge graphs.

The digital tags provide a mechanism for users to securely access and utilize the information, with the knowledge graphs linking data in a way that optimizes performance and enhances the overall usability of the data. Finally, parallel processing of data across the system within data clean rooms is managed using bidirectional dual node hashchains and the gossip protocol. The coordinated operation of these components ensures that the system can handle large volumes of data efficiently, optimizing performance and enhancing system resilience against cyber-attacks by providing a scalable architecture that supports real-time data processing.

In some arrangements, the identity nodes within data clean rooms generate hash keys by processing partial metadata received from multiple sources, ensuring that no single node contains complete dataset information, thereby enhancing data security through distributed metadata processing.

In some arrangements, the translation nodes within data clean rooms anonymize the data by transforming original IDs into anonymous IDs and re-key IDs, preventing re-identification of the original data, and maintaining data privacy during processing and analysis.

In some arrangements, the Laplace noise enabler capsules within data clean rooms introduce noise to the translation layer logs by applying a Laplace mechanism, enhancing the privacy of the data through differential privacy techniques that make it difficult for adversaries to infer sensitive information from the anonymized data.

In some arrangements, the bidirectional dual node hashchains within data clean rooms facilitate metadata sharing by establishing cryptographic links between adjacent nodes, ensuring secure and efficient data transmission, and maintaining data integrity across the distributed system.

In some arrangements, the cognitive analytics layer within data clean rooms verifies the integrity of the received hashed encrypted data packets using the gossip protocol, allowing for real-time validation of data across the system, and ensuring that any discrepancies are quickly identified and addressed to maintain data security.

In some arrangements, the BERT transformers in the analytics workspace layer within data clean rooms analyze and match re-key IDs, enabling the creation of digital tags for datasets, which facilitate secure data sharing and consumption by linking data through knowledge graphs for optimized performance.

In some arrangements, the digital tags created within data clean rooms are used to link data through knowledge graphs, providing optimized performance and secure access to the information, and ensuring that users can securely consume and utilize the data as needed.

In some arrangements, the system's parallel processing capabilities within data clean rooms are managed through the coordinated operation of bidirectional dual node hashchains and the gossip protocol, ensuring scalability and resilience against cyber-attacks, and allowing the system to handle large volumes of data efficiently.

In some arrangements, the entire system within data clean rooms maintains a decentralized architecture, reducing the risk of single points of failure, ensuring continuous operation even in the event of node compromises or cyber-attacks, and providing a robust and scalable solution for secure data management.

In some arrangements, a decentralized system for enhancing data privacy and security in digital communication and storage systems comprises identity nodes within data clean rooms configured to generate hash keys by processing partial metadata from different datasets and linking the hash keys through identity graphs. The identity nodes ensure that no single node contains the complete dataset information, thus enhancing security by distributing metadata across multiple nodes to prevent unauthorized access and reconstruction of the original data. The system also includes translation nodes within data clean rooms configured to perform identity resolution, data anonymization, and re-keying.

The translation nodes receive ingested data and transform original identifiers into anonymous IDs and re-key IDs, thereby preventing re-identification of the original data and maintaining privacy during both data processing and analysis stages. Furthermore, the system employs Laplace noise enabler capsules within data clean rooms configured to introduce Laplace noise into the translation layer logs by applying the Laplace mechanism to add statistical noise to the data. This enhances privacy by ensuring differential privacy, which makes it difficult for adversaries to infer sensitive information from the anonymized data even if they possess auxiliary information. The system further includes bidirectional dual node hashchains within data clean rooms configured to facilitate metadata sharing by establishing cryptographic links between adjacent nodes, ensuring secure and efficient data transmission. This maintains data integrity and consistency across the distributed system and allows for seamless integration of metadata from different bundles.

Additionally, a cognitive analytics layer within data clean rooms is configured to receive hashed encrypted data packets from various package bundles and verify the data packets during decryption using a gossip protocol. This enables real-time validation of data integrity across the system and ensures that any discrepancies or potential security breaches are quickly identified and addressed. The system also comprises BERT transformers in an analytics workspace layer within data clean rooms configured to activate re-key IDs and create digital tags for datasets. The BERT transformers analyze and match re-key IDs for secure data sharing, facilitating the creation of digital tags that are unique identifiers for datasets, ensuring that information can be securely linked and shared across the system. The digital tags created in the analytics workspace layer within data clean rooms are configured to be shared for secure consumption of information linked through knowledge graphs.

The digital tags provide a mechanism for users to securely access and utilize the information, with the knowledge graphs linking data in a way that optimizes performance and enhances the overall usability of the data. Finally, bidirectional dual node hashchains and gossip protocol within data clean rooms are configured to manage parallel processing of data across the system. The coordinated operation of these components ensures that the system can handle large volumes of data efficiently, optimizing performance and enhancing system resilience against cyber-attacks by providing a scalable architecture that supports real-time data processing.

In some arrangements, the identity nodes within data clean rooms generate hash keys by processing partial metadata received from multiple sources, ensuring that no single node contains complete dataset information, thereby enhancing data security through distributed metadata processing.

In some arrangements, the translation nodes within data clean rooms anonymize the data by transforming original IDs into anonymous IDs and re-key IDs, preventing re-identification of the original data, and maintaining data privacy during processing and analysis.

In some arrangements, the Laplace noise enabler capsules within data clean rooms introduce noise to the translation layer logs by applying the Laplace mechanism, enhancing the privacy of the data through differential privacy techniques that make it difficult for adversaries to infer sensitive information from the anonymized data.

In some arrangements, the bidirectional dual node hashchains within data clean rooms facilitate metadata sharing by establishing cryptographic links between adjacent nodes, ensuring secure and efficient data transmission, and maintaining data integrity across the distributed system.

In some arrangements, the cognitive analytics layer within data clean rooms verifies the integrity of the received hashed encrypted data packets using the gossip protocol, allowing for real-time validation of data across the system, and ensuring that any discrepancies are quickly identified and addressed to maintain data security.

In some arrangements, the BERT transformers in the analytics workspace layer within data clean rooms analyze and match re-key IDs, enabling the creation of digital tags for datasets, which facilitate secure data sharing and consumption by linking data through knowledge graphs for optimized performance.

In some arrangements, the digital tags created within data clean rooms are used to link data through knowledge graphs, providing optimized performance and secure access to the information, and ensuring that users can securely consume and utilize the data as needed.

In some arrangements, the system's parallel processing capabilities within data clean rooms are managed through the coordinated operation of bidirectional dual node hashchains and the gossip protocol, ensuring scalability and resilience against cyber-attacks, and allowing the system to handle large volumes of data efficiently.

In some arrangements, a method for enhancing data privacy and security in digital communication and storage systems comprises generating hash keys at identity nodes by processing partial metadata from different datasets and linking the hash keys through identity graphs, where the identity nodes distribute metadata across multiple nodes to prevent unauthorized access and reconstruction of the original data. The method includes performing identity resolution, data anonymization, and re-keying at translation nodes, where the translation nodes transform original identifiers into anonymous IDs and re-key IDs to maintain privacy during data processing and analysis.

The method also includes introducing Laplace noise into the translation layer logs using Laplace noise enabler capsules, where the Laplace noise enabler capsules apply the Laplace mechanism to add statistical noise to the data, ensuring differential privacy by making it difficult for adversaries to infer sensitive information from the anonymized data. The method further includes sharing metadata between adjacent bundles using bidirectional dual node hashchains, where the bidirectional dual node hashchains establish cryptographic links between adjacent nodes for secure and efficient data transmission, maintaining data integrity across the distributed system. The method also includes receiving hashed encrypted data packets at a cognitive analytics layer from various package bundles and verifying the data packets during decryption using a gossip protocol, where the cognitive analytics layer ensures real-time validation of data integrity across the system.

The method includes using an analytics workspace layer to activate re-key IDs and create digital tags for datasets, where the analytics workspace layer facilitates the secure sharing and consumption of information linked through knowledge graphs. Finally, the method includes managing parallel processing of data across the system using bidirectional dual node hashchains and gossip protocol, where the coordinated operation of these components ensures optimized performance and enhances system resilience against cyber-attacks.

The following description and claims, in conjunction with the drawings-all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 1 depicts a sample architecture flow diagram the illustrates the integration of bidirectional dual node hashchain bundles with Laplace noise enabled encapsulation within the data clean room environment, facilitating secure and privacy-preserving data management. It highlights how BERT transformers are employed for identity resolution and digital tag creation, while gossip protocols ensure efficient and reliable metadata dissemination among nodes.

FIG. 2 illustrates a process flow where data is gathered and anonymized using Laplace noise encapsulation, then securely processed through bidirectional dual node hashchain bundles for integrity and privacy. The system utilizes BERT transformers for identity resolution, gossip protocols for metadata sharing, and parallel eLedger sharing for real-time transaction recording, enabling comprehensive and privacy-preserving data analysis.

FIG. 3 depicts the sequence diagram of the system's data processing flow, illustrating the steps from metadata collection, translation, and anonymization, to the introduction of Laplace noise and final data validation using a gossip protocol. This diagram highlights the integration of bidirectional dual node hashchains and differential privacy techniques to ensure secure and efficient data management.

FIG. 4 depicts the entity relationship diagram of the Smart Bi-Directional Dual Node Hashchain-Based Remodeled Data Clean Room Bundles with Laplace Noise Enabled Encapsulation system, showing the relationships and interactions between components such as the IdentityNode, TranslationNode, LaplaceNoiseEnablerCapsule, and CognitiveAnalyticsLayer. This diagram highlights how these entities are interconnected within the DataCleanRoom to ensure secure, efficient, and privacy-preserving data management.

FIG. 5 depicts the flow diagram of the Smart Bi-Directional Dual Node Hashchain-Based Remodeled Data Clean Room Bundles with Laplace Noise Enabled Encapsulation system, illustrating the sequential steps from generating hash keys and performing identity resolution to introducing Laplace noise and managing parallel data processing. This diagram highlights the system's comprehensive approach to ensuring secure, efficient, and privacy-preserving data management.

FIG. 6 depicts a flow diagram illustrating the process of introducing Laplace noise to data at the translation layer to ensure differential privacy. It outlines the steps from data gathering and anonymization to data processing and continuous refinement, ensuring secure and efficient data management.

FIG. 7 depicts a detailed flow diagram of the gossip protocol, illustrating how metadata is disseminated and data integrity is ensured across multiple nodes in a distributed network. Each node communicates with its neighbors to share metadata, ensuring redundancy and robust data validation through overlapping communication paths.

FIG. 8. illustrates the implementation of a Laplace noise capsule for data privacy. It includes steps from data collection, determining sensitivity, setting a privacy parameter, generating and adding Laplace noise, encapsulating data, analyzing noisy data, and detecting fraudulent transactions while ensuring privacy.

DETAILED DESCRIPTION

The invention(s) disclosed herein focus on enhancing data privacy and security in digital communication and storage systems by employing an innovative architecture that integrates bidirectional dual node hashchains with Laplace noise enabler capsules within data clean rooms. This approach addresses both the performance issues and the risks of data leakage and cyber-attacks that are prevalent in existing systems. By distributing metadata across multiple nodes and ensuring no single node contains the complete dataset information, the system enhances security and prevents unauthorized access and reconstruction of the original data.

Central to the invention are identity nodes and translation nodes within data clean rooms. Identity nodes are responsible for generating hash keys by processing partial metadata from different datasets and linking these hash keys through identity graphs. This distribution of metadata across multiple nodes ensures that even if one node is compromised, the complete dataset cannot be reconstructed, thereby enhancing data security. Translation nodes perform critical functions such as identity resolution, data anonymization, and re-keying. These nodes receive ingested data and transform original identifiers into anonymous IDs and re-key IDs, preventing re-identification of the original data and maintaining privacy during data processing and analysis.

A key feature of the system is the use of Laplace noise enabler capsules to introduce statistical noise into the translation layer logs. The Laplace mechanism applied by these capsules ensures differential privacy, making it difficult for adversaries to infer sensitive information from the anonymized data even if they possess auxiliary information. This method significantly enhances data privacy by adding a layer of protection that obscures the true values in the data, ensuring compliance with stringent data privacy regulations and standards.

The system also employs bidirectional dual node hashchains to facilitate secure and efficient metadata sharing. These hashchains establish cryptographic links between adjacent nodes, ensuring that data integrity and consistency are maintained across the distributed system. This setup allows for seamless integration of metadata from different bundles and supports secure data transmission between nodes. By linking nodes bidirectionally, the system enhances data security and resilience against potential cyber-attacks.

The cognitive analytics layer is another vital component of the system, designed to receive hashed encrypted data packets from various package bundles within data clean rooms. This layer verifies the data packets during decryption using a gossip protocol, which ensures real-time validation of data integrity across the system. Any discrepancies or potential security breaches are quickly identified and addressed, maintaining the system's overall security and reliability. The use of a gossip protocol ensures that information is efficiently and reliably disseminated among the nodes.

Within the analytics workspace layer, BERT transformers play a crucial role. These advanced AI models are used to activate re-key IDs and create digital tags for datasets. The BERT transformers analyze and match re-key IDs, facilitating secure data sharing by creating digital tags that serve as unique identifiers for datasets. These digital tags ensure that information can be securely linked and shared across the system, optimizing data performance and usability.

The digital tags created in the analytics workspace layer are shared for secure consumption of information linked through knowledge graphs. These tags provide a mechanism for users to securely access and utilize the information, with the knowledge graphs linking data in a way that optimizes performance and enhances the overall usability of the data. This feature ensures that users can interact with the data securely and efficiently, meeting their needs while maintaining high levels of data privacy and security.

The system's architecture supports parallel processing of data across the network using bidirectional dual node hashchains and the gossip protocol. This coordinated operation ensures that the system can handle large volumes of data efficiently, optimizing performance and enhancing resilience against cyber-attacks. The scalable architecture supports real-time data processing, making it suitable for applications requiring high-speed data access and analysis.

A significant advantage of the system is its decentralized architecture, which reduces the risk of single points of failure. By distributing data processing and storage across multiple nodes, the system ensures continuous operation even in the event of node compromises or cyber-attacks. This decentralized approach enhances the system's robustness and reliability, making it a scalable solution for secure data management.

The identity nodes within the system generate hash keys by processing partial metadata received from multiple sources. This method ensures that no single node contains complete dataset information, thereby enhancing data security through distributed metadata processing. The translation nodes anonymize the data by transforming original IDs into anonymous IDs and re-key IDs, maintaining data privacy during both processing and analysis stages.

The Laplace noise enabler capsules within data clean rooms introduce noise to the translation layer logs by applying the Laplace mechanism. This technique enhances the privacy of the data through differential privacy methods that make it difficult for adversaries to infer sensitive information from the anonymized data. The bidirectional dual node hashchains facilitate metadata sharing by establishing cryptographic links between adjacent nodes, ensuring secure and efficient data transmission.

The cognitive analytics layer verifies the integrity of the received hashed encrypted data packets using the gossip protocol, allowing for real-time validation of data across the system. This layer ensures that any discrepancies are quickly identified and addressed, maintaining data security and system reliability. The BERT transformers in the analytics workspace layer analyze and match re-key IDs, enabling the creation of digital tags for datasets, which facilitate secure data sharing and consumption by linking data through knowledge graphs.

The digital tags created within data clean rooms are used to link data through knowledge graphs, providing optimized performance and secure access to the information. This ensures that users can securely consume and utilize the data as needed, meeting their requirements while maintaining data privacy. The system's parallel processing capabilities are managed through the coordinated operation of bidirectional dual node hashchains and the gossip protocol, ensuring scalability and resilience against cyber-attacks.

Overall, the system offers a comprehensive solution for enhancing data privacy and security in digital communication and storage systems. By integrating advanced cryptographic techniques, differential privacy methods, and AI-driven analytics, the system provides robust protection against data leakage and cyber-attacks. The innovative architecture ensures secure metadata sharing, real-time validation, and optimized performance, addressing the need for advanced, scalable, and privacy-preserving data management solutions.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

Terms such as "computers," "machines," and similar phrases are used interchangeably based on the context to denote devices that may be general-purpose or specialized for specific functions, whether virtual or physical, and capable of network connectivity. This encompasses all pertinent hardware, software, and components known to those skilled in the field. Such devices might feature specialized circuits like application-specific integrated circuits (ASICs), microprocessors, cores, or other processing units for executing, accessing, controlling, or implementing various types of software, instructions, data, modules, processes, or routines. The employment of these terms within this document is not intended to restrict or exclusively refer to any specific type of electronic devices or components, and should be interpreted broadly by those with relevant expertise. For conciseness and assuming familiarity, detailed descriptions of computer/software components and machines are omitted.

Software, executable code, data, modules, procedures, and similar entities may reside on tangible, physical computer-readable storage devices. This includes a range from local memory to network-attached storage, and various other accessible memory types, whether removable, remote, cloud-based, or accessible through other means. These elements can be stored in both volatile and non-volatile memory forms and may operate under different conditions such as autonomously, on-demand, as per a preset schedule, spontaneously, proactively, or in response to certain triggers. They may be consolidated or distributed across multiple computers or devices, integrating their memory and other components. These elements can also be located or dispersed across network-accessible storage systems, within distributed databases, big data infrastructures, blockchains, or distributed ledger technologies, whether collectively or in distributed configurations.

The term "networks" and similar references encompass a wide array of communication systems, including local area networks (LANs), wide area networks (WANs), the Internet, cloud-based networks, and both wired and wireless configurations. This category also covers specialized networks such as digital subscriber line (DSL) networks, frame relay networks, asynchronous transfer mode (ATM) networks, and virtual private networks (VPN), which may be interconnected in various configurations. Networks are equipped with specific interfaces to facilitate diverse types of communications—internal, external, and administrative—and have the ability to assign virtual IP addresses (VIPs) as needed. Network architecture involves a suite of hardware and software components, including but not limited to access points, network adapters, buses, both wired and wireless ethernet adapters, firewalls, hubs, modems, routers, and switches, which may be situated within the network, on its edge, or externally. Software and executable instructions operate on these components to facilitate network functions. Moreover, networks support HTTPS and numerous other communication protocols, enabling them to handle packet-based data transmission and communications effectively.

As used herein, Generative Artificial Intelligence (AI) or the like refers to AI techniques that learn from a representation of training data and use it to generate new content similar to or inspired by existing data. Generated content may include human-like outputs such as natural language text, source code, images/videos, and audio samples. Generative AI solutions typically leverage open-source or vendor sourced (proprietary) models, and can be provisioned in many ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used under various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models-Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in biology and medicine. (5) NVIDIA AI Models-Megatron: A large, powerful transformer model designed for natural language processing tasks. (6) IBM AI Models-Watson: Known for its application in various fields for processing and analyzing large amounts of natural language data. (7) XLNet: An extension of the Transformer model, outperforming BERT in several bench-marks. (8) GROVER: Designed for detecting and generating news articles, useful in understanding media-related content. These models represent a range of applications and capa-bilities in generative AI. One or more of the foregoing may be used herein as desired. All are considered within the sphere and scope of this disclosure.

Generative AI and LLMs can be used in various parts of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Infor-mation Retrieval and Storage: Efficiently managing and accessing large data sets. (4) Software Development Life-cycle: Encompassing programming, application develop-ment, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Pro-cessing, searching, retrieving, and using large quantities of information effectively. (9) Data Classification: Categoriz-ing and classifying data for better organization and analysis. (10) Feedback Learning: Processes whereby AI/LLMs improve performance based on feedback it receives. (Key aspects can include, for example, human feedback, Rein-forcement Learning, interactive learning, iterative improve-ment, adaptation, etc.). (11) Context Determination: Identi-fying the relevant context in various scenarios. (12) Writing Assistance: Offering help in composing human-like text for various forms of writing. (13) Language Analysis: Analyz-ing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Infor-mation Summarization: Condensing information into con-cise summaries. (19) Creative Content Generation: Produc-ing original and imaginative content. (20) Language Translation: Converting text or speech from one language to another.

FIG. 1, by way of non-limiting disclosure, depicts a sample architecture diagram. The architecture diagram of the system for enhancing data privacy and security in digital communication and storage systems is intricately designed, showcasing the interaction between various components within data clean rooms.

The architecture flow diagram of the system for enhanc-ing data privacy and security in digital communication and storage systems is a meticulously designed framework com-prising interconnected components within data clean rooms. The system is built around bidirectional dual-node bundled data clean rooms, each designated with specific numbers and functionalities.

Starting with the bidirectional dual-node hashchain bundles, we have Bundle 100, which includes Identity Node_1 and Translation Node_1. Identity Node_1 shares partial metadata from different datasets, generating hash keys that are linked through identity graphs. Translation Node_1 forms another layer of the hashchain architecture, performing identity resolution, data anonymization, and re-keying, creating anonymous IDs and re-key IDs that are securely linked in the distributed system. This dual-node structure ensures that metadata is distributed across multiple nodes, enhancing security by preventing unauthorized access and reconstruction of the original data.

Bundle 102 contains Identity Node_2 and Translation Node_2. Identity Node_2 also shares partial metadata and generates hash keys linked through identity graphs, while Translation Node_2 performs similar functions as Transla-tion Node_1, ensuring data privacy and security through anonymization and re-keying processes. This redundancy and distribution across bundles help maintain consistent and secure data processing.

Bundle 104 includes Identity Node_3 and Translation Node_3. Identity Node_3 continues the process of sharing partial metadata and generating hash keys linked through identity graphs. Translation Node_3 further enhances data security by performing identity resolution and generating anonymous IDs and re-key IDs, maintaining privacy during both data processing and analysis stages.

Bundle 106 comprises Identity Node_4 and Translation Node_4. Identity Node_4 shares partial metadata and gen-erates hash keys linked through identity graphs, while Trans-lation Node_4 handles identity resolution and the generation of anonymous and re-key IDs. This ensures that the data remains anonymized and secure throughout its lifecycle.

Bundle 108 features Identity Node_N and Translation Node_N. Identity Node_N shares partial metadata, generat-ing hash keys linked through identity graphs, and Transla-tion Node_N performs identity resolution, data anonymiza-tion, and re-keying. This distributed system links anonymous IDs and re-key IDs securely, maintaining data privacy and security.

The entire system is enveloped by a smart Laplace mechanism-based differential privacy layer, which intro-duces noise for additional privacy. This layer ensures dif-ferential privacy, making it computationally infeasible for adversaries to reverse-engineer sensitive information from the anonymized data, even if they possess auxiliary infor-mation.

At the core of the system is the Cognitive Analytics Layer 110. This layer receives hashed encrypted data packets from different package bundles. During decryption, these data packets are verified using a gossip protocol from other package bundles, ensuring real-time validation of data integ-rity. The cognitive analytics layer identifies and addresses any discrepancies or potential security breaches, acting as the system's verification engine to maintain high security standards.

The Analytics Workspace Layer is another critical com-ponent, receiving parallel information from the dual node identity layer. Equipped with BERT transformers-based AI engines, this layer matches re-key IDs for activation and creates digital tags for datasets. These digital tags are unique identifiers for datasets, facilitating secure data sharing and consumption. The analytics workspace layer thus serves as the system's data management and analysis hub, leveraging AI to enhance data security and functionality.

Metadata sharing between the bidirectional bundles is enabled using identity graphs, maintaining metadata from adjacent bundles. This interconnected structure ensures that the system can handle large volumes of data efficiently while maintaining high security standards.

Users interact with the system through digital tags, con-suming information linked through knowledge graphs. These digital tags provide a mechanism for secure access and utilization of information, with the knowledge graphs linking data to optimize performance and usability. This ensures that users can interact with the data securely and efficiently.

Overall, the architecture flow diagram illustrates a highly secure and efficient system designed to enhance data privacy and security. The bidirectional dual-node hashchain bundles (100, 102, 104, 106, and 108) work together to distribute and secure metadata, while the Cognitive Analytics Layer 110 ensures data integrity through real-time validation. The Analytics Workspace Layer, equipped with AI-powered BERT transformers, facilitates the secure sharing and consumption of data through digital tags and knowledge graphs. The entire system is enveloped by a differential privacy layer that introduces noise to protect sensitive information, providing a robust and scalable solution for modern data privacy and security challenges.

Collectively, the bidirectional dual-node hashchain bundles in combination with the analytics layer form a series of data clean rooms. In a data clean room, the architecture typically consists of three specific layers: the translation layer, the entity layer, and the analytics layer. Each layer has a distinct role in ensuring the effective, secure, and privacy-compliant use of data. The proposed architecture of the present invention, the translation layer and the entity layer are embedded and implemented in each individual bidirectional dual-node hashchain bundle whereas the analytics layer is shared amongst all of the bundles.

The translation layer is responsible for converting data into a common format that can be understood and used across the system. This involves standardizing data from different sources to ensure consistency and compatibility. Its key functions include data ingestion, which collects data from various sources, data standardization, which transforms the ingested data into a unified format, and data cleaning, which identifies and corrects errors, removes duplicates, and handles missing values to improve data quality. Additionally, the translation layer involves data enrichment, which enhances the data by integrating additional information, such as metadata or external data sources, to provide more context.

The entity layer focuses on organizing data around specific entities, such as customers, products, or transactions, to create a coherent and comprehensive view. This layer is crucial for establishing relationships between different data points and ensuring data integrity. Key functions of the entity layer include entity resolution, which identifies and merges records that refer to the same entity even if they come from different sources or have varying identifiers, and entity management, which maintains a central repository of entities, ensuring that each entity is uniquely represented and consistently referenced. Additionally, data linking connects related data points across different datasets, creating a network of relationships that provides a holistic view of each entity. The entity layer also implements data privacy techniques, such as anonymization or pseudonymization, to protect sensitive information while maintaining analytical utility.

The analytics layer is where data analysis and insights generation take place. This layer leverages the standardized and entity-organized data to perform various types of analyses, ranging from descriptive to predictive analytics. The key functions of the analytics layer include data exploration, which allows users to explore and visualize data to uncover patterns, trends, and anomalies, and statistical analysis, which applies statistical methods to analyze data, test hypotheses, and derive insights. Additionally, machine learning utilizes algorithms to build predictive models, perform clustering, and automate decision-making processes. Reporting and visualization generate reports and visualizations that communicate findings in an understandable and actionable manner. The analytics layer also provides tools and environments for collaborative analysis, enabling multiple users to work together on data projects while ensuring data security and privacy.

These three layers work together seamlessly to create a robust data clean room environment. Data flows from the translation layer, where it is standardized and cleaned, to the entity layer, where it is organized and linked, and finally reaches the analytics layer, where it is analyzed and insights are generated. Insights from the analytics layer can inform improvements in the translation and entity layers, creating a continuous cycle of refinement and enhancement. Throughout all layers, stringent privacy and security measures are implemented to ensure that data is protected and used in compliance with relevant regulations and policies. By structuring a data clean room with these layers, organizations can maximize the value of their data while maintaining control, privacy, and compliance.

In the present invention, BERT transformers are instrumental in enhancing both the privacy and performance of data clean rooms by enabling advanced identity resolution and digital tag creation within the analytics workspace layer. BERT, or Bidirectional Encoder Representations from Transformers, leverages the sophisticated Transformer architecture, which was introduced by Vaswani et al. in 2017. This architecture employs self-attention mechanisms that allow it to process the entire sequence of words simultaneously, capturing long-range dependencies and intricate relationships between words. This bidirectional approach enables BERT to understand the context of each word based on both its preceding and succeeding words, resulting in a profound and nuanced comprehension of textual data.

In this invention, BERT's ability to grasp context is utilized to resolve identities across various data sources accurately. The analytics workspace layer employs BERT transformers to analyze and cross-reference data points, identifying connections and correlations that might not be immediately apparent. By examining the surrounding context of data points, BERT can link related information, even when the data is represented differently across sources. This capability is crucial for creating precise digital tags that uniquely represent entities within the data clean room environment. These digital tags are essential for tracking and managing data, ensuring that each piece of information is accurately identified and associated with the correct entity.

The role of BERT transformers in this system goes beyond simple data tagging. Their deep contextual understanding allows for the creation of sophisticated, detailed digital tags that capture the essence of the data. This process is vital for maintaining data integrity and ensuring that the analysis performed within the clean room is both comprehensive and reliable. BERT's ability to generate high-quality digital tags supports robust data analysis by providing clear and accurate identifiers for each data entity, facilitating more effective data management and utilization.

Furthermore, the application of BERT transformers in the invention enhances the functionality and reliability of the data clean room. By accurately resolving identities and generating detailed digital tags, the system can maintain a high level of data privacy while enabling thorough and insightful analysis. This process is integral to the invention's overall architecture, which employs bidirectional dual node hashchain bundles and Laplace noise enabled encapsulation to secure and efficiently share metadata. The advanced NLP capabilities of BERT transformers, combined with these innovative data structures, ensure that the system preserves data privacy without compromising performance.

The bidirectional dual node hashchain bundles provide a robust framework for data integrity and security, while the Laplace noise enabled encapsulation adds an additional layer of privacy protection by introducing controlled noise to the data. BERT transformers enhance these structures by ensuring that the digital tags and identity resolutions are accurate and reliable, thereby supporting the overall goal of the invention. The integration of BERT transformers into this system not only improves the accuracy and depth of data analysis but also ensures that the data clean room operates efficiently and securely, providing a powerful tool for managing and analyzing sensitive data.

In the present invention, gossip protocols play a pivotal role in ensuring efficient and secure dissemination of metadata within the data clean room environment. Gossip protocols are decentralized communication mechanisms inspired by the way information spreads in social networks: through gradual sharing from one node to another until it propagates throughout the entire network. These protocols are especially well-suited for distributed systems due to their scalability, fault tolerance, and simplicity.

Gossip protocols function by having each node periodically communicate with a randomly selected subset of other nodes, sharing its current state or information. This periodic exchange ensures that data spreads quickly and reliably across the network. In the context of the invention, gossip protocols facilitate the continuous and robust sharing of metadata among nodes within the data clean room. This decentralized approach eliminates the need for a central authority, enhancing the system's resilience and reducing single points of failure.

The probabilistic nature of gossip protocols ensures that even if some nodes fail or drop out of the network, the information still reaches the majority of the nodes with high reliability. This redundancy is crucial for maintaining the integrity and availability of metadata in the data clean room, where ensuring data consistency and security is paramount. Gossip protocols' ability to handle node failures gracefully contributes to the system's robustness, making it highly resilient to disruptions and network partitions.

By using gossip protocols, the invention achieves efficient metadata sharing without compromising on security. Each node in the network operates independently, selecting peers randomly for information exchange, which makes it difficult for adversaries to predict and manipulate the communication pattern. This randomness enhances the security of the metadata dissemination process, ensuring that sensitive information is shared securely and only with authorized nodes.

Moreover, gossip protocols support the dynamic nature of the data clean room environment. As nodes join or leave the network, the protocol seamlessly adapts to these changes, maintaining efficient communication and data dissemination. This adaptability is essential for a system designed to handle large-scale, dynamic data environments where the network topology can change frequently.

The integration of gossip protocols with other components of the invention, such as bidirectional dual node hashchain bundles and Laplace noise enabled encapsulation, further strengthens the system. The hashchain bundles provide a secure framework for tracking data integrity, while the Laplace noise encapsulation ensures privacy by adding controlled noise to the data. Gossip protocols enhance these mechanisms by ensuring that metadata is shared efficiently and securely among all nodes, maintaining the overall integrity and privacy of the system.

In summary, gossip protocols are a crucial element of the present invention, providing a scalable, resilient, and secure method for disseminating metadata within the data clean room. Their decentralized nature, fault tolerance, and adaptability make them ideal for the dynamic and sensitive environment of the data clean room, ensuring that metadata is shared efficiently and securely among all nodes. The combination of gossip protocols with other advanced data structures and privacy-preserving techniques ensures that the system operates effectively, maintaining high levels of data privacy and performance.

In the present invention, Laplace noise capsules play a critical role in enhancing data privacy within the data clean room environment. These capsules introduce controlled noise into the data, utilizing principles from differential privacy to ensure that individual data points cannot be easily re-identified or linked back to their sources. Laplace noise capsules are based on the Laplace distribution, a probability distribution used in differential privacy to add random noise to data. This distribution is chosen because it has a higher probability of producing small values and a lower probability of producing large values, making it well-suited for preserving the statistical properties of the original data while ensuring privacy.

When data enters the clean room environment, it is first encapsulated within Laplace noise capsules. Each capsule represents a data point or a set of data points with added noise from the Laplace distribution. This process ensures that the data is anonymized and protected against re-identification attacks. The encapsulated data within the Laplace noise capsules can then be used for analysis without compromising individual privacy. Analysts can perform computations and derive insights from the noisy data, which closely approximate the results that would have been obtained from the original data. This allows for meaningful analysis while ensuring that individual data points remain confidential.

The privacy budget, or epsilon, can be dynamically adjusted based on the sensitivity of the data and the specific privacy requirements of different analyses. For highly sensitive data, a smaller epsilon can be used to ensure maximum privacy, while for less sensitive data, a larger epsilon can be employed to improve data utility. The Laplace noise capsules work in conjunction with the bidirectional dual node hashchain bundles, which provide a secure framework for tracking and verifying the integrity of the data. The hashchain bundles ensure that any modifications to the data, including the addition of noise, are securely recorded and verifiable. This integration enhances the overall security and reliability of the data clean room.

When metadata is shared among nodes within the data clean room using gossip protocols, it is also encapsulated within Laplace noise capsules. This ensures that even as metadata is disseminated across the network, it remains protected against unauthorized access and re-identification. The use of Laplace noise capsules in this context ensures that the metadata sharing process preserves privacy while maintaining the efficiency and security provided by the gossip protocols. By adding noise to the data, Laplace noise capsules ensure that individual data points cannot be easily re-identified, thereby protecting the privacy of the data subjects. Despite the added noise, the data within the Laplace noise capsules retains its statistical properties, allowing for accurate and meaningful analysis.

The ability to adjust the privacy budget provides flexibility in balancing privacy and data utility based on specific requirements and sensitivity levels. When combined with bidirectional dual node hashchain bundles, Laplace noise capsules contribute to a secure and verifiable data environment, ensuring both privacy and data integrity. Laplace noise capsules are a fundamental component of the present invention, designed to enhance data privacy by introducing controlled noise into the data. Utilizing the Laplace distribution, these capsules ensure that individual data points are anonymized while retaining their statistical utility for analysis. The integration of Laplace noise capsules with bidirectional dual node hashchain bundles and gossip protocols creates a robust framework for secure, private, and efficient data management within the data clean room environment. This innovative approach ensures that sensitive data can be analyzed and shared without compromising privacy or security, achieving a delicate balance between data utility and confidentiality.

FIG. 2, by way of non-limiting depiction, is a sample process flow illustration that provides an intricate depiction of a sophisticated system designed to ensure data privacy and integrity through the use of smart bi-directional dual node hashchain-based remodeled data clean room bundles with Laplace noise enabled encapsulation. This system enables multiple organizations, such as financial institutions, to collaborate securely and effectively by maintaining the privacy of sensitive data while performing detailed analytics.

The process begins with the data gathering stage, labeled as item 200, where metadata is collected from various datasets. During this stage, data IDs are extracted and sent to translation nodes. Each translation node receives partial IDs from the datasets, ensuring that no single node has complete information about any individual data point. This distribution of data fragments prevents unauthorized access and enhances security.

At step 202, the translation node is detailed. This node consists of enablers for identity resolution, data anonymization, and re-keying. When data is ingested into the system, it is translated and keyed to anonymous IDs. This process involves converting sensitive information into a format that cannot be directly linked to the original data points, thus protecting individual identities. Additionally, the identity node within this stage maintains the e-ledger and shared metadata information from adjacent bundles. The dual nodes, which are interlinked and operate in close collaboration using identity graphs, ensure seamless data processing. These identity graphs facilitate the linking of related data points across different nodes, enhancing the system's ability to match and reconcile identities without exposing sensitive information. During this step, IDs are re-keyed for activation matching, which means that they are re-encoded to allow secure cross-referencing and analysis. The bidirectional processing is loosely coupled through a gossip protocol, which aids in sharing metadata from adjacent bundles for metadata key verifications. This protocol ensures that all nodes in the network can verify and update their records based on the latest information, enhancing data consistency and integrity across the system.

Moving to step 204, the Laplace-based encapsulation process is described. This stage involves a differential privacy engine that introduces noise using the Laplace mechanism. This mechanism adds random noise to the data, making it difficult for adversaries to infer any specific information from the anonymized data. The noise is merged with translation layer logs, ensuring that the added noise is consistent and structured. Specifically, the Laplace mechanism functions by adding noise to continuous values in the dataset, thereby ensuring a formal measure of privacy protection.

The process is defined mathematically: given a function $f(D)$ where D is the dimension of the output, the Laplace mechanism adds noise according to the scale parameter b of the Laplace distribution. The probability density function for the Laplace distribution is given by:

$$Lap(x \mid b) - \frac{1}{2b} e^{-\frac{|x|}{b}}$$

Thus, for a dataset D, the Laplace mechanism A is defined as:

$$A(D) = f(D) + Lap(0 \mid b)$$

This ensures that individual data points are protected by adding a layer of randomness, preserving privacy while maintaining the utility of the data for analysis.

At step 206, the analytics workspace layer comes into play. This layer receives data from all bundles in parallel, ensuring that all incoming data is processed simultaneously for efficiency. The gossip protocol plays a crucial role here by revalidating the keys, ensuring that all nodes in the network are synchronized and that their data is consistent. Digital tags, created in each bundle as unique IDs, reference the system of record datasets to match IDs from different bundles. These digital tags act as unique identifiers that allow the system to track and reconcile data points across different datasets without exposing sensitive information. This layer also enables audience activation and management for user-based information processing and reconciliation. The analytics workspace layer is equipped with BERT transformers-based AI engines, which use advanced natural language processing techniques to match re-keyed IDs for activation and create digital tags for datasets to be shared. Users can consume this information, which is linked through knowledge graphs for optimized performance, enabling them to derive insights and perform detailed analyses while ensuring data privacy and integrity.

Finally, step 208 involves the continuous refinement and optimization of the cognitive deep learning model. This step ensures that the system remains robust and effective over time by constantly improving its algorithms and processing techniques. This stage also enables multi-user data processing and analytics with controlled data packets and audience measurement, ensuring that multiple users can access and analyze the data securely and efficiently. Controlled data packets ensure that the data shared with users is appropriately segmented and anonymized, maintaining privacy while enabling comprehensive analysis.

In summary, the figure illustrates a highly sophisticated system where data is securely gathered, anonymized, and processed through various stages, leveraging advanced cryptographic techniques and machine learning models to ensure privacy and integrity. Each step, from data gathering to Laplace noise encapsulation and parallel processing in the analytics workspace layer, is meticulously designed to work in tandem, ensuring a seamless and secure data management process. The integration of metadata sharing, node tagging, noise inclusion, identity graph-based linking, secure data packet generation, and parallel eLedger sharing creates a robust framework that balances privacy, security, and data utility, enabling organizations to collaborate effectively while protecting sensitive information.

In FIG. 3, the sequence diagram provides an in-depth view of the complex interactions within the system, specifically tailored for enhancing data privacy and security through innovative cryptographic techniques. The process initiates with the collection of metadata from various datasets (300), which involves gathering essential data points necessary for subsequent processing stages. This metadata serves as the foundation for extracting data IDs, which are then directed to translation nodes (302). These nodes play a pivotal role in translating the extracted data IDs and associating them with anonymous IDs (304). This translation is critical for maintaining the anonymity of the data, ensuring that sensitive information cannot be easily traced back to its original source.

The translation nodes also maintain an electronic ledger (e-ledger) that records all transactions and shared metadata, ensuring a transparent and auditable trail of data operations (306). This ledger is integral to the system's integrity, providing a verifiable history of data interactions. Following this, the system interlinks dual nodes using identity graphs (308), which are sophisticated structures that map and link metadata from adjacent bundles. These identity graphs facilitate secure and efficient metadata sharing, enhancing the system's resilience against unauthorized access.

The translated and keyed data IDs are then re-keyed for activation matching (310), a process that further anonymizes the data and prepares it for secure processing. Re-keying involves generating new keys that replace the original ones, thereby adding an additional layer of security. To bolster privacy, Laplace noise is introduced into the system (312). This noise, generated through differential privacy techniques, is merged with the translation layer logs (314). The introduction of Laplace noise ensures that any identifiable information is obfuscated, making it extremely difficult for adversaries to reverse-engineer the data.

Simultaneously, the system receives data from all bundles in parallel (316), a process that enables efficient and simultaneous data processing across the network. This parallel processing capability is essential for handling large volumes of data without compromising on performance. The system then employs a gossip protocol to revalidate the keys (318). This protocol is a decentralized communication method that ensures information is disseminated efficiently and reliably among the nodes, maintaining data integrity and consistency.

Digital tags are created for the datasets (320). These tags are unique identifiers that facilitate secure data sharing and consumption, linking the data through knowledge graphs for optimized performance and usability (322). The digital tags serve as markers that help in tracking and managing the data throughout its lifecycle, ensuring that it can be securely accessed and utilized as needed.

The cognitive deep learning model is continuously refined and optimized based on the processed data (324). This model, equipped with advanced AI capabilities, plays a crucial role in analyzing and interpreting the data, enabling sophisticated analytics and insights. The system supports multi-user data processing and analytics, allowing multiple users to access and analyze the data simultaneously without compromising on security or performance (326).

The detailed description of the invention elaborates on the architecture and functionalities of the system. It includes bundles that comprise identity nodes and translation nodes, which work in parallel to manage and secure data. The identity nodes generate hash keys and share partial metadata from different datasets through identity graphs. These identity graphs enable secure and efficient metadata linking, ensuring data integrity and confidentiality across the system. The translation nodes perform critical processes such as identity resolution, data anonymization, and re-keying, essential for maintaining data privacy and security.

One of the core inventive features is the bidirectional property of the dual node hashchains. This feature allows for metadata sharing between adjacent bundles, creating a resilient and scalable network. The bidirectional links ensure data integrity even if one of the nodes is compromised, making it difficult for attackers to manipulate or corrupt data without detection. This innovative approach provides an additional layer of security, enhancing the system's robustness.

The Laplace noise enabler capsules introduce differential privacy into the system. These capsules utilize the Laplace mechanism to add noise to data logs, ensuring that sensitive information remains protected even during data processing and analysis. By merging Laplace noise with the translation layer logs, the system effectively anonymizes data, making it resistant to reverse engineering and other forms of cyberattacks.

The cognitive analytics layer receives hashed encrypted data packets from various package bundles. This layer verifies the data packets during decryption using a gossip protocol, which facilitates real-time validation and enhances the system's overall security. The gossip protocol ensures that information is disseminated efficiently and reliably among the nodes, maintaining data integrity and consistency across the network.

The analytics workspace layer leverages BERT transformers, advanced AI models capable of bidirectional reading and validation of data. These transformers play a vital role in re-key ID activation and the creation of digital tags for datasets. The digital tags are unique identifiers that help in the secure sharing and consumption of information, linking data through knowledge graphs for optimized performance. This ensures that the system can process and analyze data efficiently while maintaining high levels of security and privacy.

The system's decentralized approach using gossip protocol and bidirectional dual node hashchains ensures robust security and scalability. Each bundle within the system operates as a closely knit package, loosely coupled through the gossip protocol. This architecture allows for parallel processing, optimizing performance and enhancing the system's resilience to cyber-attacks. The decentralized nature also reduces the risk of single points of failure, making the system more reliable and secure.

Identity nodes within the system generate partial metadata from different datasets and create hash keys that link through identity graphs. This process ensures that data is securely shared and managed across the network. The translation nodes handle anonymization and re-keying, converting ingested data into anonymous IDs and re-key IDs. This transformation ensures that sensitive information remains protected throughout its lifecycle.

The Laplace noise enabler capsules are integral to the system's privacy-preserving capabilities. By introducing noise into the data, these capsules make it difficult for adversaries to infer sensitive information even when they have access to anonymized data. This approach provides a formal measure of privacy protection, ensuring that the system complies with stringent data privacy regulations and standards.

The cognitive analytics layer serves as the center of the system, managing the verification and decryption of encrypted data packets. By using the gossip protocol, this layer ensures that data integrity is maintained and that any discrepancies are quickly identified and addressed. This real-time validation process enhances the security and reliability of the system, providing robust protection against cyber-attacks.

The analytics workspace layer, equipped with BERT transformers, performs crucial functions such as re-key ID activation and digital tag creation. These AI-driven processes enable the system to efficiently manage and analyze large volumes of data while maintaining high levels of security and privacy. The digital tags created in this layer are used for secure data sharing and consumption, linking information through knowledge graphs to enhance performance and usability.

The system's design ensures that even in the event of a cyber-attack, the impact is minimized. The bidirectional dual node hashchains and gossip protocol provide multiple layers of security and redundancy, making it difficult for attackers to compromise the system. If a node is attacked, the other nodes can quickly identify and isolate the issue, ensuring that the system continues to function effectively. This resilience is a crucial aspect of the system's design, ensuring continuous operation even under adverse conditions.

Furthermore, the system is designed to be scalable, allowing it to handle increasing volumes of data without compromising performance or security. The parallel processing capabilities of the bundles ensure that the system can manage large datasets efficiently, providing real-time data processing and analysis. This scalability is crucial for modern applications that require high-speed data access and processing.

In summary, the invention offers a comprehensive solution for enhancing data privacy and security in digital communication and storage systems. By integrating bidirectional dual node hashchains with Laplace noise enabler capsules, the system provides robust protection against data leakage and cyber-attacks. The innovative architecture ensures secure metadata sharing, real-time validation, and optimized performance, addressing the long-felt need for advanced, scalable, and privacy-preserving data management solutions. The unique combination of advanced cryptographic techniques, differential privacy, and AI-driven analytics sets a new standard for data security and privacy, providing a robust and scalable solution for modern data management challenges.

As an example by illustration, consider a scenario where multiple financial institutions aim to collaborate in detecting and preventing fraudulent transactions while maintaining the privacy of their customers' data. Each financial institution starts by anonymizing its transaction data through the process of Laplace noise encapsulation. For instance, Bank A possesses transaction records that include sensitive information such as account numbers, transaction amounts, and merchant details. To protect this data, the system encapsulates it within Laplace noise capsules, adding controlled noise to each data point. This ensures that, while the overall patterns and trends in the data are preserved, individual transactions cannot be traced back to specific customers, thus maintaining privacy.

Once anonymized, the data is integrated into the system using bidirectional dual node hashchain bundles. For each transaction record, the system creates a pair of hashchains—one for forward linking and one for backward linking. These hashchains provide a robust mechanism for ensuring data integrity and security. If any modifications are attempted on a transaction record from Bank A, the hashchain structure will reflect this change, enabling the system to detect and address the discrepancy swiftly. This ensures that all data remains consistent and tamper-proof, thereby preserving trust among the collaborating institutions.

Following this, BERT transformers come into play to resolve identities and create digital tags. BERT, or Bidirectional Encoder Representations from Transformers, analyzes the context surrounding each data point to accurately link related information. For example, if Customer Y has transactions across multiple banks, such as Bank A and Bank B, BERT can identify these transactions as belonging to the same individual. It then creates a unique digital tag for Customer Y without revealing their identity. This process is crucial for maintaining privacy while still enabling comprehensive data analysis across different institutions.

In parallel, metadata sharing and node tagging are performed. Each node (bank) in the network tags its data and includes noise to preserve privacy further. This tagged and noisy metadata is then disseminated using gossip protocols. These protocols facilitate decentralized communication by allowing each node to periodically and randomly select other nodes to exchange information with, ensuring efficient and secure metadata spread across the network. For instance, Bank A shares its tagged metadata with Bank B, which in turn shares it with Bank C, and so forth, until all banks have the necessary information to collaborate effectively.

Simultaneously, identity graph-based linking is employed to generate secure data packets. This involves creating a graph that links related data points across different nodes based on the resolved identities and digital tags provided by BERT transformers. These secure data packets are then generated for further analysis and storage, ensuring that data integrity and security are maintained throughout the process.

Parallel eLedger sharing is another crucial component of the system. Each transaction is recorded in a distributed eLedger that ensures transparency and immutability. This eLedger is shared among all nodes, allowing for real-time updates and verification of transactions. This parallel processing ensures that all steps are performed efficiently and simultaneously within each bundle, although for ease of understanding, these steps have been described separately.

Within the analytics layer of the system, several key functionalities are performed. These include secure data sharing, which ensures that sensitive information is protected during analysis; advanced analytics and machine learning (ML) techniques, which are applied to the data to derive insights and detect fraudulent patterns; audience measurement, which involves assessing the reach and impact of certain data points; and audience activation, which uses the insights gained to take actionable steps. Parallel processing is employed to handle large volumes of data simultaneously, and ID matching based on tags ensures accurate and efficient identity resolution.

Each identity node within the system performs specific tasks. These include node tagging, which involves marking data points with unique identifiers; eLedger entry, where transactions are recorded in the distributed ledger; re-keying, which ensures that cryptographic keys are regularly updated for security purposes; data packet creation, which involves generating secure data packets for analysis and storage; and ID validation, which checks the accuracy and validity of the identity resolutions.

Similarly, each transaction node performs its own set of functions. These include hash key generation, which creates unique cryptographic hashes for data points; identity resolution, which matches data points to their corresponding identities based on the tags; and key encryption, which ensures that data is securely encrypted before it is shared or stored.

In this example, the integration of Laplace noise encapsulation, bidirectional dual node hashchain bundles, BERT transformers, gossip protocols, identity graph-based linking, and parallel eLedger sharing illustrates a sophisticated and secure system for managing sensitive financial data. The architecture ensures that all components work in tandem to provide a robust data clean room environment that balances privacy, security, and utility, enabling financial institutions to collaborate effectively in detecting and preventing fraud.

FIG. 4 of the document illustrates an intricate entity relationship diagram detailing the interconnected components of the Smart Bi-Directional Dual Node Hashchain-Based Remodeled Data Clean Room Bundles with Laplace Noise Enabled Encapsulation system. At the center of this architecture is the DataCleanRoom (400), identified by a unique Id string, which acts as the primary container for the entire system's operations. This central entity encapsulates various critical components that collectively ensure secure, efficient, and privacy-preserving data management.

Within the DataCleanRoom, one of the primary components is the IdentityNode (412). This node, also identified by an Id string and linked via a DataCleanRoomId string, is crucial for generating hash keys and sharing partial metadata from different datasets. The IdentityNode performs identity resolution, transforming raw data into a format that preserves user anonymity. By generating and managing these hash keys, the IdentityNode ensures that each piece of data is securely tagged and traceable within the system, enhancing both security and privacy.

The TranslationNode, similarly identified by an Id string and linked to the DataCleanRoomId string, works closely with the IdentityNode. Its primary role is to handle the translation and re-keying of data IDs. This process involves converting original data IDs into anonymous IDs, thereby anonymizing the data and further protecting user privacy. The TranslationNode also re-keys these IDs to prepare them for activation matching, which is critical for secure data transactions and analysis within the clean room.

Another vital component is the LaplaceNoiseEnablerCapsule (404). Identified by its Id string and linked to the DataCleanRoomId string, this capsule introduces differential privacy through the Laplace mechanism. By adding statistical noise to the data, the LaplaceNoiseEnablerCapsule ensures that even during processing and analysis, sensitive information remains protected. This additional layer of noise makes it significantly more challenging for potential attackers to reverse-engineer the data and infer any personal information.

The BidirectionalDualNodeHashchain (406) is another cornerstone of the system, identified by its Id string and linked to the DataCleanRoomId string. This component facilitates secure metadata sharing between adjacent nodes. The bidirectional nature of these hashchains allows for robust linking of data, ensuring that metadata can flow securely and efficiently across the network. This capability is essential for maintaining data integrity and consistency in a scalable and resilient manner.

The CognitiveAnalyticsLayer (402), identified by an Id string and linked to the DataCleanRoomId string, serves as the center of the system. This layer is responsible for receiving hashed encrypted data packets from various bundles and verifying them during decryption using a gossip protocol (408). The gossip protocol, identified by its Id string and linked to the DataCleanRoomId string, enables real-time validation and ensures that information is disseminated efficiently among nodes. This decentralized communication method enhances the system's reliability and reduces the risk of single points of failure.

ParallelProcessing (410), identified by an Id string and linked to the DataCleanRoomId string, is another critical component that allows the system to handle data from multiple bundles simultaneously. This parallel processing capability ensures that large volumes of data can be managed and processed efficiently, optimizing overall system performance.

The AnalyticsWorkspaceLayer (414), identified by an Id string and linked to the DataCleanRoomId string, utilizes advanced AI models known as BERT transformers (420). These transformers, identified by their Id string and linked to the AnalyticsWorkspaceLayerId string, are capable of bidirectional reading and validation of data. They are integral to the processes of re-key ID activation and the creation of digital tags (416). The digital tags, also identified by an Id string and linked to the AnalyticsWorkspaceLayerId string, act as unique identifiers for datasets, facilitating secure data sharing and management.

The KnowledgeGraph (418), identified by an Id string and linked to the DigitalTagId string, uses these digital tags to link data efficiently. By connecting information through these graphs, the system enhances data usability and performance, ensuring that users can access and consume data securely and effectively. The KnowledgeGraph helps in organizing and visualizing the complex relationships between different data points, providing a clear and comprehensive view of the data landscape within the clean room.

Overall, FIG. 4 presents a detailed and expansive view of the Smart Bi-Directional Dual Node Hashchain-Based Remodeled Data Clean Room Bundles with Laplace Noise Enabled Encapsulation system. Each component, from the IdentityNode and TranslationNode to the CognitiveAnalyticsLayer and BERT transformers, is meticulously designed to work in unison, ensuring that data privacy, security, and processing efficiency are maintained at all times. This architecture represents a significant advancement in data management technologies, addressing the critical needs for secure and privacy-preserving data processing in today's digital landscape.

FIG. 5 illustrates a comprehensive flow diagram that outlines the sequence of operations within the Smart Bi-Directional Dual Node Hashchain-Based Remodeled Data Clean Room Bundles with Laplace Noise Enabled Encapsulation system. The process begins at step 500 with the generation of hash keys at Identity Nodes. This initial step is crucial as it sets the foundation for the secure and efficient management of data within the system. The Identity Nodes are responsible for creating unique hash keys that are used to tag and track data throughout its lifecycle, ensuring integrity and security.

Following the generation of hash keys, the system moves to step 502, where identity resolution, data anonymization, and re-keying are performed at Translation Nodes. In this step, the Translation Nodes play a pivotal role by converting original data identifiers into anonymous IDs and subsequently re-keying them. This process ensures that the data remains anonymized, protecting user privacy while allowing for secure data transactions and processing.

In step 504, Laplace noise is introduced into the translation layer logs. This step involves adding statistical noise to the data logs using the Laplace mechanism, which is a differential privacy technique. The introduction of Laplace noise ensures that sensitive information remains obscured even during data processing and analysis, making it difficult for adversaries to extract meaningful information from the anonymized data.

The next phase, step 506, involves sharing metadata between adjacent bundles using bidirectional dual node hashchains. These hashchains create a secure and efficient method for linking and sharing metadata across the network. The bidirectional nature of these hashchains allows for robust data verification and validation, ensuring that metadata can be securely and efficiently shared between nodes.

In step 508, hashed encrypted data packets are received at a cognitive analytics layer. This layer is responsible for decrypting and analyzing the data packets, ensuring that they are verified and validated in real-time. The cognitive analytics layer leverages advanced AI algorithms to process the data, providing insights and ensuring the integrity of the data throughout its lifecycle.

The process continues to step 510, where an analytics workspace layer is used to activate re-key IDs and create digital tags. The analytics workspace layer employs sophisticated AI models, such as BERT transformers, to analyze and match re-key IDs, ensuring that data can be securely tagged and managed. The creation of digital tags facilitates secure data sharing and consumption, linking data through knowledge graphs for optimized performance and usability.

Finally, in step 512, the system manages parallel processing of data across the network using bidirectional dual node hashchains and gossip protocol. This step ensures that data from all bundles is processed simultaneously, optimizing performance and enabling efficient handling of large volumes of data. The gossip protocol plays a crucial role in maintaining data integrity and consistency across the distributed network, ensuring that information is disseminated efficiently and reliably among nodes.

In summary, FIG. 5 presents a detailed flow diagram that captures the intricate sequence of operations within the Smart Bi-Directional Dual Node Hashchain-Based Remodeled Data Clean Room Bundles with Laplace Noise Enabled Encapsulation system. Each step, from generating hash keys and performing identity resolution to introducing Laplace noise and managing parallel processing, is meticulously designed to ensure data privacy, security, and efficiency. This innovative system addresses the critical needs for secure and privacy-preserving data management in today's digital landscape.

FIG. 6 is another sample flow diagram to illustrate aspects of this invention. In the initial stage of the process, known as 600: Data Gather, metadata is collected from various datasets. This involves extracting essential data points necessary for subsequent processing stages, with the goal of gathering as much relevant data as possible to ensure comprehensive analysis and processing. Once the data is gathered, the next step is 602: Metadata Extraction. Here, data IDs are extracted from the collected metadata. These data IDs are crucial for identifying and processing the data in the following stages, ensuring that each piece of data can be uniquely identified and managed.

The extracted data IDs are then sent to the translation nodes in 604: Translation Nodes. These nodes play a pivotal role in translating the data into a common format and associating them with anonymous IDs. This translation process ensures that sensitive information is anonymized and protected against unauthorized access. Within the translation nodes, identity nodes are responsible for maintaining an electronic ledger (e-ledger) and shared metadata in 606: Identity Nodes. The e-ledger records all transactions, providing a transparent and auditable trail of data operations. Additionally, the identity nodes facilitate secure and efficient metadata sharing, enhancing the system's ability to match and reconcile identities without exposing sensitive information.

608: Data Anonymization is performed within the translation nodes. This crucial step involves converting sensitive information into a format that cannot be directly linked to the original data points, ensuring that individual identities are protected and the data can be processed securely. Following anonymization, the process involves 610: Re-key IDs. Re-keying generates new keys that replace the original ones, further anonymizing the data and adding an additional layer of security. This step prepares the data for secure cross-referencing and analysis, ensuring that sensitive information remains protected throughout the data processing lifecycle.

In 612: Laplace Noise Encapsulation, the differential privacy engine introduces Laplace noise to the data. The Laplace mechanism adds random noise to the data, making it difficult for adversaries to infer specific information from the anonymized data. This process ensures a formal measure of privacy protection while maintaining the utility of the data for analysis. The introduced Laplace noise is then merged with the translation layer logs in 614: Merge Noise with Translation Layer Logs. Merging the noise ensures that the added randomness is consistent and structured, further enhancing the privacy and security of the data while maintaining the integrity of the anonymized data.

The analytics workspace layer is a critical component in 616: Analytics Workspace Layer that receives data from all bundles in parallel, ensuring efficient and simultaneous data processing across the network. This layer is equipped with advanced AI models, specifically BERT transformers, which match re-keyed IDs for activation and create digital tags for datasets. The analytics workspace layer enables audience activation and management for user-based information processing and reconciliation. These digital tags serve as unique identifiers that facilitate secure data sharing and consumption, linking the data through knowledge graphs for optimized performance and usability.

618: Continuous Refinement and optimization of the cognitive deep learning model follow, ensuring that the system remains robust and effective over time. By constantly improving its algorithms and processing techniques, the system enhances its overall performance and reliability. This continuous refinement is crucial for maintaining high levels of accuracy and efficiency in data processing.

Finally, the process involves 620: Data Processing & Analysis, enabling multi-user data processing and analytics with controlled data packets and audience measurement. This final step ensures that multiple users can access and analyze the data securely and efficiently. The system provides comprehensive insights and analysis while maintaining data privacy and integrity, allowing for effective data collaboration and informed decision-making.

Overall, this sophisticated system ensures data privacy and security through advanced cryptographic techniques and differential privacy mechanisms. Each step in the process, from 600: Data Gather to 620: Data Processing & Analysis, works in tandem to gather, anonymize, and process data efficiently while maintaining high levels of privacy and security. The integration of Laplace noise encapsulation, identity resolution, and continuous refinement ensures that sensitive information is protected throughout the data processing lifecycle, enabling secure and effective data analysis and collaboration.

FIG. 7 depicts a detailed flow diagram illustrating how the gossip protocol operates to disseminate metadata and ensure data integrity across nodes within a distributed network. The process begins with 700: Node A, which initiates the gossip protocol by sending metadata to its neighboring nodes, 702: Node B and 704: Node C. This initial dissemination is crucial as it kickstarts the propagation of information throughout the network, ensuring that the metadata begins to reach other nodes swiftly and efficiently. Node A also sends metadata directly to 706: Node D, illustrating the redundancy and robustness of the communication paths, which are designed to ensure that metadata dissemination is not hindered by potential node failures.

Node B (702) receives metadata from Node A and subsequently forwards it to Node D (706) and 708: Node E. This step exemplifies the chain of communication where each node, upon receiving metadata, immediately forwards it to its peers. This method ensures that the information is disseminated broadly and quickly, reinforcing data integrity through multiple pathways. Node C (704), following a similar procedure, forwards the metadata to Node E (708) and 710: Node F, further propagating the information through the network and ensuring that the data reaches a wider audience.

Node D (706) continues the propagation by sending metadata to Node F (710) and 712: Node G. This dissemination strategy ensures that even nodes located further away from the origin node receive the necessary metadata, maintaining a consistent flow of information. Node E (708) plays a crucial role by forwarding metadata to Node G (712) and 714: Node H. This redundancy in communication paths ensures that metadata reaches all nodes in the network through multiple routes, enhancing the reliability and robustness of the data dissemination process. Node F (710) then sends metadata to Node H (714), ensuring that Node H receives information from multiple sources, which helps in validating the data through several channels. Node G (712) also sends metadata to Node H (714), adding an additional layer of confirmation and reliability to the process.

The gossip protocol's design ensures that each node in the network receives metadata from multiple neighboring nodes. This redundancy is vital for creating a robust and fault-tolerant system. The overlapping communication paths, as depicted by the arrows indicating the flow of metadata between nodes, highlight the protocol's resilience against data loss and corruption. Each node's role is to act as both a transmitter and receiver of metadata, ensuring that the network remains robust and data integrity is maintained across all nodes.

In practice, the gossip protocol operates under the principles of decentralized communication. Each node independently selects peers to share information with, ensuring that the network remains resilient and scalable. By spreading metadata through a series of overlapping paths, the protocol minimizes the risk of data loss and ensures that all nodes in the network can verify and update their records based on the latest information. This decentralized approach eliminates single points of failure and enhances the overall security and reliability of the system.

The implementation of the gossip protocol supports real-time validation of data integrity across the system. This ensures that any discrepancies or potential security breaches are quickly identified and addressed. The cryptographic links between nodes ensure that metadata is securely transmitted, maintaining data integrity and consistency across the distributed system. This setup allows for seamless integration of metadata from different bundles and supports secure data transmission between nodes, enhancing the overall robustness of the system.

Additionally, the gossip protocol's ability to handle node failures gracefully contributes significantly to the system's robustness. Each node periodically communicates with a randomly selected subset of other nodes, sharing its current state or information. This periodic exchange ensures that data spreads quickly and reliably across the network, maintaining high levels of data consistency and integrity. The probabilistic nature of the gossip protocol ensures that even if some nodes fail or drop out of the network, the information still reaches the majority of the nodes with high reliability. This redundancy is crucial for maintaining the integrity and availability of metadata in the data clean room, where ensuring data consistency and security is paramount.

The protocol achieves efficient metadata sharing without compromising security. Each node in the network operates independently, selecting peers randomly for information exchange, making it difficult for adversaries to predict and manipulate the communication pattern. This randomness enhances the security of the metadata dissemination process, ensuring that sensitive information is shared securely and only with authorized nodes. The adaptability of gossip protocols is essential for handling large-scale dynamic data environments where the network topology can change frequently. This dynamic nature allows the system to scale effectively, providing a versatile solution for various applications and industries that require secure and reliable data management.

In summary, FIG. 7 illustrates a sophisticated and highly effective method for disseminating metadata and ensuring data integrity across a distributed network. By leveraging the gossip protocol, the system maintains robust data integrity, enhances security, and provides a scalable solution for secure data management in complex and dynamic environments. The combination of decentralized communication, cryptographic security measures, and redundancy ensures that the system can handle large volumes of data efficiently while maintaining high standards of data integrity and security. This design not only supports efficient data dissemination but also ensures that the system remains resilient and robust, capable of adapting to changes and potential failures within the network.

General pseudocode examples for implementing the Smart Bi-Directional Dual Node Hashchain-Based Remodeled Data Clean Room Bundles with Laplace Noise Enabled Encapsulation system is detailed below.

Each segment of the pseudocode corresponds to a specific aspect of the invention, illustrating how the system can be constructed programmatically.

```
# Pseudocode for generating hash keys at Identity Nodes
function generateHashKeys(data):
    hashKeys = [ ]
    for record in data:
        hashKey = hashFunction(record)
        hashKeys.append(hashKey)
```

-continued

```
    return hashKeys
# Pseudocode for performing identity resolution, data anonymization, and
re-keying at Translation Nodes
function identityResolution(data):
    anonymizedData = [ ]
    for record in data:
        anonymizedID = anonymize(record.id)
        reKeyedID = reKey(anonymizedID)
        anonymizedData.append((anonymizedID, reKeyedID))
    return anonymizedData
# Pseudocode for introducing Laplace noise into the translation layer logs
function introduceLaplaceNoise(data, epsilon):
    noisyData = [ ]
    for value in data:
        noise = laplaceNoise(epsilon)
        noisyValue = value + noise
        noisyData.append(noisyValue)
    return noisyData
# Pseudocode for sharing metadata between adjacent bundles using
bidirectional dual node hashchains
function shareMetadata(metadata, bundles):
    for bundle in bundles:
        for adjacentBundle in bundle.getAdjacentBundles( ):
            sharedMetadata = hashFunction(metadata)
            adjacentBundle.receiveMetadata(sharedMetadata)
# Pseudocode for receiving hashed encrypted data packets at a Cognitive
Analytics Layer
function receiveDataPackets(dataPackets):
    validatedPackets = [ ]
    for packet in dataPackets:
        if validatePacket(packet):
            decryptedPacket = decrypt(packet)
            validatedPackets.append(decryptedPacket)
    return validatedPackets
# Pseudocode for using an Analytics Workspace Layer to activate re-key
IDs and create digital tags
function activateReKeyIDs(data):
    digitalTags = [ ]
    for record in data:
        reKeyID = activateReKey(record.id)
        digitalTag = createDigitalTag(reKeyID)
        digitalTags.append(digitalTag)
    return digitalTags
# Pseudocode for managing parallel processing of data across the system
using bidirectional dual node hashchains and gossip protocol
function parallelProcessing(dataBundles):
    results = [ ]
    for bundle in dataBundles:
        processedData = processBundle(bundle)
        gossipProtocolDisseminate(processedData)
        results.append(processedData)
    return results
# Helper functions
function hashFunction(data):
    # Implement a secure hash function
    return hash(data)
function anonymize(id):
    # Implement anonymization logic
    return "anon_" + id
function reKey(anonymizedID):
    # Implement re-keying logic
    return "rekey_" + anonymizedID
function laplaceNoise(epsilon):
    # Generate Laplace noise based on epsilon
    return random.laplace(0, 1/epsilon)
function validatePacket(packet):
    # Validate the integrity of the data packet
    return packet.isValid( )
function decrypt(packet):
    # Decrypt the data packet
    return decryptFunction(packet)
function activateReKey(id):
    # Activate re-key ID logic
    return "active_" + id
function createDigitalTag(reKeyID):
    # Create a digital tag
    return "tag_" + reKeyID
```

-continued

```
function processBundle(bundle):
    # Process data within the bundle
    return bundle.processData( )
function gossipProtocolDisseminate(data):
    # Disseminate data using gossip protocol
    gossipNetwork.distribute(data)
```

In this pseudocode, the generateHashKeys function begins by iterating over each record in the dataset to generate a hash key using a secure hash function. This function is essential for tagging and tracking data securely. The identityResolution function processes the data to anonymize and re-key each record's ID. Anonymization is achieved by converting the original IDs into anonymous IDs, which are then re-keyed to ensure data privacy.

The introduceLaplaceNoise function adds Laplace noise to the data to maintain differential privacy. This noise is calculated based on an epsilon parameter, ensuring that sensitive information is obfuscated. The shareMetadata function handles the distribution of metadata between adjacent bundles using bidirectional dual node hashchains, enhancing the system's resilience and security by ensuring metadata is securely linked and shared.

The receiveDataPackets function focuses on the cognitive analytics layer, where data packets are validated and decrypted if they pass validation. This ensures that only secure and verified data is processed further. The activateReKeyIDs function is part of the analytics workspace layer, where re-key IDs are activated and digital tags are created for secure data sharing.

Finally, the parallelProcessing function manages the concurrent processing of data across the system using bidirectional dual node hashchains and a gossip protocol. This method ensures efficient and secure dissemination of processed data throughout the network. Helper functions such as hashFunction, anonymize, reKey, laplaceNoise, validatePacket, decrypt, activateReKey, createDigitalTag, processBundle, and gossipProtocolDisseminate provide the necessary support for the main functions, implementing specific tasks required for data processing and security within the system.

This pseudocode outlines a comprehensive implementation of the invention, ensuring data privacy, security, and efficient processing using advanced cryptographic and differential privacy techniques integrated with AI-driven analytics.

```
Laplace sample pseudocode for implementation of various aspects of the
invention is set forth below for additional reference.
# Pseudocode for Laplace Noise Capsule Implementation
# Step 1: Data Collection
# Collect raw data points (e.g., transaction records)
data_collection = collect_transaction_data( )
# Step 2: Determine Sensitivity
# Calculate the sensitivity (Δf) of the query or function
sensitivity = calculate_sensitivity(data_collection)
# Step 3: Set Privacy Parameter (ε)
# Choose an appropriate privacy parameter (ε)
epsilon = choose_privacy_parameter( )
# Step 4: Generate Laplace Noise
# Generate Laplace noise with scale Δf / ε
def generate_laplace_noise(scale):
    return random_laplace(0, scale)
scale = sensitivity / epsilon
# Step 5: Add Noise to Data
# Add the generated noise to each data point
noisy_data = [ ]
```

-continued

```
for data_point in data_collection:
    noise = generate_laplace_noise(scale)
    noisy_data_point = data_point + noise
    noisy_data.append(noisy_data_point)
# Step 6: Encapsulate Data
# Encapsulate the noisy data into Laplace noise capsules
laplace_noise_capsules = encapsulate_data(noisy_data)
# Step 7: Data Analysis
# Perform data analysis on the encapsulated noisy data
analysis_results = analyze_data(laplace_noise_capsules)
# Step 8: Fraud Detection Outcome
# Detect fraudulent transactions using the noisy data
fraud_detection_results = detect_fraud(analysis_results)
# Functions used in pseudocode
def collect_transaction_data( ):
    # Implementation for collecting transaction data
    pass
def calculate_sensitivity(data):
    # Implementation for calculating sensitivity (Δf)
    pass
def choose_privacy_parameter( ):
    # Implementation for choosing privacy parameter (ε)
    pass
def random_laplace(mean, scale):
    # Implementation for generating noise from Laplace distribution
    import random
    u = random.uniform(−0.5, 0.5)
    return mean − scale * sgn(u) * log(1 − 2 * abs(u))
def sgn(x):
    # Sign function implementation
    return (x > 0) − (x < 0)
def encapsulate_data(noisy_data):
    # Implementation for encapsulating noisy data into capsules
    pass
def analyze_data(capsules):
    # Implementation for analyzing noisy data capsules
    pass
def detect_fraud(analysis_results):
    # Implementation for detecting fraud from analysis results
    pass
```

By way of a step-by-step sample implementation of Laplace noise capsule implementation, the following can be considered as an example and is also illustrated in FIG. 8.

Step 800: Data Collection—In the first step, the bank collects raw transaction data or transaction records from various sources, including ATMs, online banking platforms, and physical branches. This data typically includes details such as transaction amounts, timestamps, locations, and account numbers. The goal is to gather all relevant transaction records that need to be protected while ensuring comprehensive data coverage for subsequent analysis.

Step 802: Determine Sensitivity—Next, the bank calculates the sensitivity of the function or query that will be applied to the collected data. Sensitivity, denoted as $\Delta f$, measures the maximum amount by which a single transaction can alter the outcome of the analysis. For instance, if the analysis involves summing transaction amounts, the sensitivity would be the maximum possible transaction amount. This step is crucial as it directly influences the scale of the noise to be added.

Step 804: Set Privacy Parameter ($\varepsilon$)—The bank then selects an appropriate privacy parameter, E, which controls the trade-off between privacy and accuracy. A smaller E value provides stronger privacy but introduces more noise into the data, potentially reducing its utility. Conversely, a larger E value offers less privacy but results in more accurate data. Choosing the right & is essential to balance the need for privacy with the need for useful analysis results.

Step 806: Generate Laplace Noise—To generate the noise, the bank uses the Laplace distribution, which is particularly suited for differential privacy. The noise is generated with a mean of zero and a scale parameter defined as the sensitivity divided by $\varepsilon$ (scale=$\Delta f/\varepsilon$). The Laplace noise is then sampled for each transaction. This process ensures that the added noise is appropriately scaled to provide the desired level of privacy.

Step 808: Add Noise to Data—Once the noise is generated, it is added to each transaction record. For example, if a transaction amount is $50 and the sampled noise is $30, the resulting noisy transaction value would be $80. This step effectively obfuscates the original data, making it difficult for an adversary to discern any individual transaction details while maintaining the overall statistical properties of the data for analysis.

Step 810: Encapsulate Data—The noisy data is then encapsulated into Laplace noise capsules. These capsules package the noisy transaction records in a secure format, ensuring that they are ready for further analysis or sharing with other institutions. Encapsulation involves structuring the data so that it can be easily and securely transmitted while preserving the privacy guarantees provided by the added noise.

Step 812: Data Analysis—With the data encapsulated, the bank proceeds to perform data analysis on the noisy transaction records. Analysts use the encapsulated data to extract insights and identify patterns, such as detecting trends in transaction behavior or spotting potential fraud indicators. Despite the noise, the data retains enough utility to allow for meaningful analysis while protecting individual transaction details.

Step 814: Fraud Detection Outcome—Finally, the results of the data analysis are used to detect fraudulent transactions. The analysis might involve comparing transaction patterns to known fraud signatures or using machine learning models trained on noisy data to predict fraud. The added noise ensures that the privacy of individual transactions is maintained, even as the bank effectively identifies and mitigates fraudulent activities.

With respect to functions used in the Laplace pseudocode, the function collect_transaction_data is responsible for gathering transaction data from various sources within the bank, ensuring that all relevant records are included. The function calculate_sensitivity determines the sensitivity of the query by measuring the maximum change in the output caused by a single transaction. This is crucial for setting the correct scale for the noise. The function choose_privacy_parameter allows the bank to select an appropriate E value, balancing privacy and data utility.

To generate the Laplace noise, the function random_laplace samples noise from the Laplace distribution, using the mean and scale parameters. The sign function sgn is used to determine the direction of the noise. The function encapsulate_data packages the noisy data into Laplace noise capsules, ready for secure analysis or sharing. The function analyze_data performs the actual analysis on the encapsulated data, extracting useful insights despite the added noise. Finally, the function detect_fraud uses the analysis results to identify and flag potentially fraudulent transactions.

This detailed step-by-step example of Laplace noise capsules ensures that sensitive transaction data is protected while still allowing meaningful analysis. By carefully calculating sensitivity, selecting appropriate privacy parameters, and adding Laplace noise, banks can maintain the privacy of individual transactions. Encapsulating the noisy data into secure capsules allows for effective collaboration and analysis, ultimately helping to detect and prevent fraud.

The disclosed Smart Bi-Directional Dual Node Hashchain-Based Remodeled Data Clean Room Bundles with Laplace Noise Enabled Encapsulation system can be adapted and modified in various ways while still adhering to the core principles and objectives of the invention. These alternate embodiments and potential modifications enhance the system's versatility, scalability, and applicability across different domains and use cases, all within the spirit and scope of the original invention.

As one example, alternative Laplace formulas and methods of calculation may also be used in addition to or in lieu of what is described herein and illustrated by example.

One potential modification involves the implementation of additional layers of security through the use of quantum-resistant cryptographic algorithms. As quantum computing advances, traditional cryptographic methods may become vulnerable. By integrating quantum-resistant algorithms, such as lattice-based cryptography, the system can future-proof its data protection mechanisms, ensuring long-term security against potential quantum threats.

Another alternate embodiment could involve the use of federated learning techniques within the cognitive analytics layer. Federated learning enables the training of machine learning models across decentralized devices or servers holding local data samples, without exchanging the data itself. This approach enhances privacy by keeping data localized and only sharing model updates, thus reducing the risk of data breaches and improving the overall security posture of the system.

The system could also be modified to support various types of differential privacy mechanisms beyond Laplace noise. For instance, Gaussian noise could be employed in certain scenarios where it provides better utility-privacy trade-offs. This flexibility allows the system to adapt to different regulatory requirements and privacy standards, making it suitable for a wider range of applications and industries.

Furthermore, the architecture could be expanded to support multi-cloud environments, enabling seamless integration and interoperability across different cloud service providers. This would enhance the system's scalability and fault tolerance, ensuring continuous operation even in the event of cloud-specific outages or disruptions. Additionally, the system could leverage containerization technologies like Docker and Kubernetes to facilitate easy deployment and management of the various components, further improving scalability and operational efficiency.

In terms of data processing, the system could incorporate real-time data streaming capabilities using technologies such as Apache Kafka or Apache Pulsar. Real-time data streaming would enable the system to handle continuous data flows and provide immediate insights, making it highly suitable for time-sensitive applications such as financial trading, emergency response, and IoT deployments.

Another potential modification involves enhancing the gossip protocol with advanced consensus mechanisms, such as those used in blockchain technology. Integrating consensus algorithms like Proof of Stake (POS) or Practical Byzantine Fault Tolerance (PBFT) can enhance the reliability and robustness of the metadata sharing and validation processes, ensuring consistent and trustworthy data across the distributed network.

Moreover, the system could be adapted to support privacy-preserving computation techniques such as homomorphic encryption or secure multi-party computation (SMPC). These techniques allow computations to be performed on encrypted data without decrypting it, further enhancing data privacy and security during processing and analysis.

The user interface and accessibility features could also be improved by incorporating advanced visualization tools and user-friendly dashboards. This would enable end-users to interact with the system more intuitively, access insights more efficiently, and manage data privacy settings with greater ease. Additionally, incorporating natural language processing (NLP) capabilities could facilitate more intuitive queries and interactions with the system, making it accessible to a broader range of users, including those without technical expertise.

Finally, the system could be designed to be compliant with various international data privacy regulations, such as the General Data Protection Regulation (GDPR) in Europe, the California Consumer Privacy Act (CCPA) in the United States, and other regional data protection laws. This compliance would ensure that the system can be deployed globally while adhering to local legal requirements, thus broadening its applicability and market reach.

In summary, the disclosed invention can be modified and adapted in numerous ways to enhance its security, scalability, versatility, and usability. These alternate embodiments and potential modifications demonstrate the system's robustness and flexibility, ensuring that it remains a cutting-edge solution for secure, efficient, and privacy-preserving data management in a rapidly evolving digital landscape. All are considered to be within the scope of this disclosure.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for enhancing data privacy in digital communication and storage systems, comprising:
    generating hash keys at identity nodes within data clean rooms by processing partial metadata from different datasets and linking the hash keys through identity graphs;
    performing identity resolution, data anonymization, and re-keying at translation nodes within the data clean rooms, wherein the translation nodes transform original identifiers into anonymous identifiers (IDs) and re-key IDs;
    introducing Laplace noise into translation layer logs using Laplace noise enabler capsules to add statistical noise to the data, ensuring differential privacy;
    sharing metadata between adjacent bundles using bidirectional dual node hashchains to establish cryptographic links for secure and efficient data transmission;
    receiving hashed encrypted data packets at a cognitive analytics layer from various package bundles and verifying the data packets during decryption using a gossip protocol for real-time validation of data integrity; and
    using an analytics workspace layer to activate re-key IDs and create digital tags for datasets, facilitating secure data sharing and consumption linked through knowledge graphs.

2. A method for enhancing data privacy in digital communication and storage systems, comprising:

generating hash keys at identity nodes within data clean rooms by processing partial metadata from different datasets, wherein the hash keys are linked through identity graphs to ensure no single node contains complete dataset information;

performing identity resolution, data anonymization, and re-keying at translation nodes within the data clean rooms, wherein the translation nodes receive ingested data and transform original identifiers into anonymous identifiers (IDs) and re-key IDs;

introducing Laplace noise into translation layer logs using Laplace noise enabler capsules, wherein the Laplace noise is generated by sampling from a Laplace distribution with a scale parameter determined by sensitivity of a query and chosen privacy parameter;

sharing metadata between adjacent bundles within the data clean rooms using bidirectional dual node hashchains, wherein the hashchains establish cryptographic links between adjacent nodes to ensure secure and efficient data transmission;

receiving hashed encrypted data packets at a cognitive analytics layer from various package bundles within the data clean rooms, wherein the cognitive analytics layer verifies the data packets during decryption using a gossip protocol to enable real-time validation of data integrity across the system;

using bidirectional encoder representations from transformers (BERT) transformers in an analytics workspace layer within the data clean rooms to activate re-key IDs and create digital tags for datasets, wherein the BERT transformers analyze and match re-key IDs for secure data sharing;

sharing digital tags created in the analytics workspace layer for secure consumption of information linked through knowledge graphs, wherein the digital tags provide a mechanism for users to securely access and utilize the information; and managing parallel processing of data across the system using bidirectional dual node hashchains and the gossip protocol, wherein coordinated operation ensures optimized performance and enhances system resilience against cyber-attacks.

3. The method of claim 2, wherein the identity nodes distribute metadata across multiple nodes to prevent unauthorized access and reconstruction of the original data, further comprising the step of periodically updating the identity graphs to reflect changes in the metadata and ensure continuous integrity and security.

4. The method of claim 3, wherein the translation nodes transform original identifiers into anonymous IDs and re-key IDs to maintain privacy during data processing and analysis, further comprising the step of implementing an additional layer of encryption at the translation nodes to secure the anonymous and re-key IDs before they are stored or transmitted.

5. The method of claim 4, wherein the Laplace noise enabler capsules add statistical noise to the data by sampling from a Laplace distribution having a scale parameter determined based on a sensitivity of a query and a privacy parameter, the scale parameter being larger for greater sensitivity and smaller for a larger privacy parameter, further comprising determining the sensitivity of the query based on a maximum change in output that can result from changing a single input in the dataset, selecting the privacy parameter to balance privacy and data utility, and generating noise values from the Laplace distribution.

6. The method of claim 5, wherein the Laplace noise introduced ensures differential privacy, making it computationally infeasible for adversaries to infer sensitive information from the anonymized data, further comprising the step of verifying effectiveness of noise addition by performing privacy risk assessments on encapsulated data.

7. The method of claim 6, wherein the bidirectional dual node hashchains facilitate secure and efficient metadata sharing by establishing cryptographic links between adjacent nodes, further comprising the step of periodically auditing the hashchain links to ensure their integrity and detect any unauthorized modifications.

8. The method of claim 7, wherein the gossip protocol used by the cognitive analytics layer enables real-time validation of data integrity by disseminating metadata efficiently and reliably among the nodes, further comprising the steps of:

configuring the gossip protocol to operate with randomized peer selection to enhance security and prevent targeted attacks; and implementing error-checking mechanisms to identify and correct inconsistencies in the disseminated metadata.

9. The method of claim 8, wherein the BERT transformers in the analytics workspace layer perform advanced natural language processing to analyze and match re-key IDs for activation and creation of digital tags, further comprising the step of training the BERT transformers on a diverse dataset to improve their accuracy and robustness in identity resolution and tag creation.

10. The method of claim 9, wherein the digital tags created for datasets are unique identifiers that facilitate secure data sharing and consumption by linking data through knowledge graphs, further comprising the steps of:

generating knowledge graphs that map relationships between different data points and entities within the system; and continuously updating the knowledge graphs to reflect new data and changes in existing data to ensure accurate and up-to-date tagging.

11. The method of claim 10, wherein the parallel processing capabilities managed by the bidirectional dual node hashchains and gossip protocol ensure scalability and resilience against cyber-attacks, allowing the system to handle large volumes of data efficiently, further comprising the steps of:

dynamically allocating computational resources to different nodes based on data processing demands; and implementing load balancing techniques to distribute the data processing workload evenly across the nodes to prevent bottlenecks and ensure high performance.

12. The method of claim 11, further comprising the step of utilizing a blockchain framework to enhance the security and immutability of the hash keys and metadata, wherein the blockchain framework ensures that each transaction is securely recorded and cannot be altered without detection.

13. The method of claim 12, wherein the translation nodes further include a machine learning module to improve the accuracy of identity resolution and anonymization processes, the machine learning module being trained continuously on newly ingested data to adapt to evolving patterns and enhance its performance.

14. The method of claim 13, further comprising the step of integrating homomorphic encryption techniques at the translation nodes, allowing computations to be performed on encrypted data without decrypting it, thereby maintaining data privacy throughout processing stages.

15. The method of claim 14, wherein the cognitive analytics layer employs federated learning to enable collaborative model training across multiple nodes without sharing raw data, enhancing data privacy while improving the machine learning model's accuracy and robustness.

16. The method of claim 15, further comprising the step of implementing zero-knowledge proofs to verify data integrity and authenticity within the data clean rooms, ensuring that transactions and data manipulations can be validated without revealing the actual data.

17. The method of claim 16, wherein the digital tags created by the BERT transformers are further enhanced with metadata attributes that describe the data's origin, transformation history, and access controls, providing comprehensive traceability and governance.

18. The method of claim 17, further comprising the step of utilizing an advanced access control mechanism based on attribute-based encryption (ABE) to manage user permissions and data access within the system, ensuring that only authorized users can access specific data segments.

19. The method of claim 18, wherein the analytics workspace layer includes an anomaly detection module powered by machine learning algorithms to continuously monitor data activities and identify potential security threats or unusual patterns, thereby enhancing overall security and resilience of the system.

20. A method for enhancing data privacy and security in a digital communication and storage system, the method comprising:

generating hash keys at identity nodes within data clean rooms by processing partial metadata from different datasets, wherein the hash keys are linked through identity graphs to ensure no single node contains complete dataset information;

periodically updating the identity graphs to reflect changes in the metadata and ensure continuous integrity and security;

performing identity resolution, data anonymization, and re-keying at translation nodes within the data clean rooms, wherein the translation nodes receive ingested data and transform original identifiers into anonymous identifiers (IDs) and re-key IDs;

implementing an additional layer of encryption at the translation nodes to secure the anonymous and re-key IDs before they are stored or transmitted;

introducing Laplace noise into translation layer logs using Laplace noise enabler capsules, wherein the Laplace noise is generated by sampling from a Laplace distribution with a scale parameter determined by sensitivity of a query and chosen privacy parameter;

determining the sensitivity $\Delta f$ of the query based on the maximum change in output that can result from changing a single input in the dataset;

selecting an appropriate privacy parameter $\epsilon$ to balance privacy and data utility;

generating noise values from the Laplace distribution using the scale parameter that increases as the sensitivity increases and decreases as the chosen privacy parameter increases;

verifying effectiveness of noise addition by performing privacy risk assessments on encapsulated data;

sharing metadata between adjacent bundles within the data clean rooms using bidirectional dual node hashchains, wherein the hashchains establish cryptographic links between adjacent nodes to ensure secure and efficient data transmission;

periodically auditing hashchain links to ensure their integrity and detect any unauthorized modifications;

receiving hashed encrypted data packets at a cognitive analytics layer from various package bundles within the data clean rooms, wherein the cognitive analytics layer verifies the data packets during decryption using a gossip protocol to enable real-time validation of data integrity across the system;

configuring the gossip protocol to operate with randomized peer selection to enhance security and prevent targeted attacks;

implementing error-checking mechanisms to identify and correct inconsistencies in disseminated metadata;

using bidirectional encoder representations from transformers (BERT) transformers in an analytics workspace layer within the data clean rooms to activate re-key IDs and create digital tags for datasets, wherein the BERT transformers analyze and match re-key IDs for secure data sharing;

training the BERT transformers on a diverse dataset to improve their accuracy and robustness in identity resolution and tag creation;

sharing digital tags created in the analytics workspace layer for secure consumption of information linked through knowledge graphs, wherein the digital tags provide a mechanism for users to securely access and utilize the information;

generating knowledge graphs that map relationships between different data points and entities within the system;

continuously updating the knowledge graphs to reflect new data and changes in existing data to ensure accurate and up-to-date tagging;

managing parallel processing of data across the system using bidirectional dual node hashchains and the gossip protocol, wherein coordinated operation ensures optimized performance and enhances system resilience against cyber-attacks;

dynamically allocating computational resources to different nodes based on data processing demands;

implementing load balancing techniques to distribute the data processing workload evenly across the nodes to prevent bottlenecks and ensure high performance;

utilizing a blockchain framework to enhance the security and immutability of the hash keys and metadata, wherein the blockchain framework ensures that each transaction is securely recorded and cannot be altered without detection;

including a machine learning module at the translation nodes to improve the accuracy of identity resolution and anonymization processes, wherein the machine learning module is trained continuously on newly ingested data to adapt to evolving patterns and enhance its performance;

integrating homomorphic encryption techniques at the translation nodes, allowing computations to be performed on encrypted data without decrypting it, thereby maintaining data privacy throughout processing stages;

employing federated learning at the cognitive analytics layer to enable collaborative model training across multiple nodes without sharing raw data, enhancing data privacy while improving the machine learning model's accuracy and robustness;

implementing zero-knowledge proofs to verify data integrity and authenticity within the data clean rooms, ensuring that transactions and data manipulations can be validated without revealing the actual data;

enhancing the digital tags created by the BERT transformers with metadata attributes that describe the data's origin, transformation history, and access controls, providing comprehensive traceability and governance;

utilizing an advanced access control mechanism based on attribute-based encryption (ABE) to manage user permissions and data access within the system, ensuring that only authorized users can access specific data segments; and including an anomaly detection module powered by machine learning algorithms in the analytics workspace layer to continuously monitor data activities and identify potential security threats or unusual patterns, thereby enhancing overall security and resilience of the system.

* * * * *